(12) United States Patent
Sung et al.

(10) Patent No.: US 7,835,420 B2
(45) Date of Patent: Nov. 16, 2010

(54) ORTHOGONAL RESOURCE BLOCK HOPPING MULTIPLEXING METHOD AND APPARATUS

(75) Inventors: Dan-keun Sung, Daejon (KR); Young-ik Seo, Daejon (KR); Bang-chul Jung, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 633 days.

(21) Appl. No.: 11/721,337

(22) PCT Filed: Dec. 9, 2005

(86) PCT No.: PCT/KR2005/004217

§ 371 (c)(1),
(2), (4) Date: Jun. 11, 2007

(87) PCT Pub. No.: WO2006/065036

PCT Pub. Date: Jun. 22, 2006

(65) Prior Publication Data

US 2009/0245396 A1    Oct. 1, 2009

(30) Foreign Application Priority Data

Dec. 16, 2004    (KR) ...................... 10-2004-0107185

(51) Int. Cl.
*H04B 1/707* (2006.01)

(52) U.S. Cl. ........................ 375/132; 370/437; 370/445

(58) Field of Classification Search ......... 375/132–138; 370/437, 445
See application file for complete search history.

(56) References Cited

U.S. PATENT DOCUMENTS

2001/0022806 A1 * 9/2001 Adachi ....................... 375/133
2001/0036113 A1 * 11/2001 Jurgensen et al. ........... 365/200

FOREIGN PATENT DOCUMENTS

KR          10-370746         2/2003

* cited by examiner

*Primary Examiner*—Kevin Y Kim
(74) *Attorney, Agent, or Firm*—Bachman & LaPointe, P.C.

(57) ABSTRACT

An orthogonal resource block hopping multiplexing (ORBHM) method and apparatus in a wired/wireless communication system in which a plurality of communication channels coexist in a single medium. The orthogonal resource block hopping multiplexing (ORBHM) communication system consists of a first communication station and a plurality of second communication stations. It uses a hopping sequence of basic orthogonal resource blocks for transmission from a first communication station to a second communication station. A basic orthogonal resource block is a part of the given orthogonal resource and orthogonal to another basic orthogonal resource block. The QRBHM uses a statistical multiplexing concept in multiplexing and transmitting messages to a plurality of second communication station by assigning basic orthogonal resource blocks every time slot in a hopping manner based on hopping patterns determined at the initial setup stage of a call or a session.

22 Claims, 30 Drawing Sheets

ORTHOGONAL RESOURCE BLOCK HOPPING MULTIPLEXING METHOD AND APPARATUS

TECHNICAL FIELD

The present invention relates to a multi-user communication system, including at least one first communication station and a plurality of second communication stations, in which a plurality of second communication stations communicate through a single medium where a finite number of communication channels may coexist. More particularly, the present invention relates to a multiplexing method and apparatus that enable a larger number of second communication stations than the finite number of communication channels determined by dedicated resource allocation by using a stastistical multiplexing concept, unlike conventional methods in which the number of second communication stations which can simultaneously communicate is limited by interference or available radio resources like orthogonal codes and frequency subcarriers. The conventional methods usually adopt a dedicated resource allocation during a call or during a communication session. The present invention relates to a multiplexing method and apparatus in which, in a system including a first communication station and a plurality of synchronized second communication stations, the first communication station identifies downlink channels to the second communication stations using orthogonal resource block hopping patterns, and allocates the orthogonal resource block hopping patterns corresponding to respective second communication stations so as to reduce the number of collisions occurring during hopping among orthogonal resources blocks. If the orthogonal resource blocks allocated to different channels are identical to each other, one collision-related channel is selected and allowed for transmission. On the contrary, transmission is delayed for the remaining channels.

BACKGROUND ART

Conventional multiplexing methods can be mainly classified into Orthogonal Time Division Multiplexing (OTDM), Orthogonal Frequency Division Multiplexing (OFDM) and Orthogonal Code Division Multiplexing (OCDM).

OTDM is a method in which each of frames 108 and 109, which is composed of a plurality of time slots T0(100)~T7 (107), as illustrated in FIG. 1a. Channels are distinguished by the time slots of a frame, and one time slot per frame is assigned to each of the second communication stations MS0~MS7, and thereby a plurality of second communication stations can simultaneously communicate. Therefore, the number of channels is determined by the number of time slots within a frame, and the number of second communication stations which can simultaneously communicate is also determined by the number of time slots within a frame.

OFDM is a method in which an available frequency bandwidth is divided into a plurality of frequency bands F0(110)~F7(117), as illustrated in FIG. 1b, channels are distinguished by the frequency bands, and one of the divided frequency bands is assigned to each of the second communication stations MS0~MS7, and thereby a plurality of second communication stations can simultaneously communicate. Therefore, the number of channels is determined by the number of frequency bands, and the number of second communication stations which can simultaneously communicate is also determined by the number of frequency bands.

OCDM is a method in which spread spectrum is used, channels are distinguished by orthogonal codes C0(120)~C7 (127), as illustrated in FIG. 1c, and one orthogonal code is assigned to each of second communication stations MS0~MS7, and thereby a plurality of second communication station can simultaneously communicate. Therefore, the number of channels is determined by the number of orthogonal codes, and the number of second communication stations which can simultaneously communicate is also determined by the number of orthogonal codes.

FIGS. 2a to 2c are schematic block diagrams of multi-user communication systems using conventional multiplexing methods. FIG. 2a is a block diagram of a multi-user communication system using Orthogonal Time Division Multiplexing (OTDM), in which messages Me0~Me7 to be transmitted to second communication stations are converted into the symbols of a signal constellation through encoders 201, interleavers 202, and symbol mappers 203 for mapping symbols according to the signal constellation to be transmitted by a physical layer. The signal constellation may be associated with QAM, QPSK, BPSK or some other signal constellation. The converted symbols Se0~Se7 are added to each other through burst formatters 210 for enabling the symbols to be inserted into the time slots assigned to respective second communication stations. At this time, the burst formatters 210 recognize the locations of time slots to be used by themselves through control signals. The signals are added to each other, pass through an analog control part 213 including a DAC 211 for converting a digital signal into an analog signal, and a Radio Frequency (RF) unit 212 for converting the baseband signal to a carrier frequency band, and are transmitted to the second communication stations through an antenna. Each second communication station must extract only a signal transmitted to itself from the multiplexed and received signals. The received signal is converted from the carrier frequency band into a baseband in a RF unit 214 and is converted from analog signal to digital signal in Analog/Digital Converter(ADC) 215. The second communication station extracts only a signal Se0 in a designated time slot from the signal passing through an Analog Control Part 216 consisting of an RF unit 214 and an ADC 215 using a burst synchronization unit 217. In the example of FIG. 1a, the second communication station receiving a signal Me0 is only shown, but the remaining second communication stations also perform the same function. The extracted signal passes through a symbol demapper 204, a deinterleaver 205, and a decoder 206, so that the transmitted message Me0 is recovered.

FIG. 2b is a block diagram of a multi-user communication system using Orthogonal Frequency Division Multiplexing (OFDM), in which messages Me0~Me7 to be transmitted to second communication stations are converted into the symbols Se0~Se7 of a signal constellation through encoders 201, interleavers 202, and symbol mappers 203, like OTDM. The converted symbols Se0~Se7 pass through a frequency selector 221 for coupling the symbols to taps assigned to the respective frequency bands of an Inverse Discrete Fourier Transform (IDFT) or Inverse Fast Fourier transform (IFFT) unit 222. The parallel signals from the IDFT or IFFT unit are converted into a serial signal (parallel-to-serial converter 233). Then, in order to decrease interference, a guard interval is added to the serial signal. Thereafter, the serial signal passes through an analog control part 213, and is transmitted via an antenna. Each of the second communication stations eliminates the guard interval from a received signal (225), converts the serial signal to parallel signals (226), performs DFT or FFT (227), and extracts only the symbol Se0 assigned to a designated frequency band according to a signal F0, which is assigned from the first communication station, and the received symbol passes through a symbol demapper 204, a deinterleaver 205, and a decoder 206, and then, the transmitted message Me0 is finally recovered.

FIG. 2c is a block diagram of a multi-user communication system using Orthogonal Code Division Multiplexing (OCDM), in which messages Me0~Me7 to be transmitted to second communication stations are converted into the symbols Se0~Se7 of a signal constellation through encoders 201, interleavers 202, and symbol mappers 203, like other multiplexing methods. The converted symbols Se0~Se7 are spread by orthogonal codes assigned to respective second communication stations (spreader 220), and pass through an analog control part 213 and are transmitted through an antenna. Each of the second communication stations extracts symbols transmitted to itself from signals received through an analog control part 216 by using a rake receiver 221. At this time, the second communication station uses an orthogonal code assigned to itself. The detail operation of the rake receiver is already known. The symbols received through the rake receiver are recovered to the originally transmitted message Me0 through a symbol demapper 204, a deinterleaver 205 and a decoder 206.

The above-described conventional multiplexing methods assign orthognal resources (time slots in OTDM, frequency bands in OFDM, and orthogonal codes in OCDM) to second communication stations, and thereby they enable a plurality of second communication stations to simultaneously communicate. However, the number of orthogonal resources is limited to N, so that the number of second communication stations which can simultaneously communicate is also limited to N (in the example of FIG. 2, N is 8). Furthermore, in a system using a conventional multiplexing method, once a call is connected, a second communication station continues to occupy assigned resources until the call is terminated, so that a new call can not be connected if an (N+1)th second communication station requests the connection of a new call. However, messages are not always exchanged during a call connection. Particularly, in the case of Internet data, the probability that there exist messages to be transmitted at a certain time is low because of bursty characteristics of data traffic. That is, although a second communication station occupies orthogonal resources, as shown in FIGS. 3a, 3b and 3c, a large amount of unused time slots or frequency bands may occur. That is, a large amount of orthogonal resources can be wasted. In order to reduce the waste of orthogonal resources, conventional multiplexing methods must use fast assignments and releases of resources, but a certain amount of the limited resources is assigned to control information because of the transmission and reception of control signal information for frequent resource assignments and releases.

DISCLOSURE

Technical Problem

Accordingly, unlike a case in which orthogonal resources have one-to-one relationship by assigning orthogonal resources to the corresponding channels in a dedicated (fixed) manner in the prior art, there is a need to increase the utilization of channels and limited orthogonal resources by statistically multiplexing traffic with low activity, and the number of users, which was limited to the number of orthogonal resources in the prior art, is increased by eliminating unnecessary control signals required for channel assignments and releases.

Technical Solution

In order to resolve the above problems of the prior art, one objective of the present invention is to provide an orthogonal resource block hopping multiplexing method and apparatus which can efficiently utilize limited orthogonal resources using a statistical multiplexing method, called orthogonal resource block hopping multiplexing, in the case of many users with low channel activity in a synchronized channel environment maintaining orthogonality, and the proposed invention can reduce a waste of resources by eliminating the unnecessary transmission of control signal during a call or during a communication session even though a transmitter and a receiver transmit and receive messages according to hopping pattern assigned to themselves at the initiation of a new call or session setup stage.

Advantageous Effects

As described in detail above, the present invention efficiently utilizes limited orthogonal resources using a statistical multiplexing method, called orthogonal resource block hopping multiplexing, in the case where the activity of synchronized channels maintaining orthogonality is low, and the present invention has low additional implementation complexity compared to the conventional methods. Particularly, there is no addition of specific hardware except for an orthogonal resource block hopping pattern generator at the receiver and a hopping pattern generator and a collision comparator and controller at the transmitter. Furthermore, a transmitter and a receiver transmit and receive messages according to a hopping pattern assigned to themselves without excessive signaling for channel assignments and releases, so that a waste of resources due to the transmission of control signal can be decreased.

Furthermore, the present invention can distinguish a much larger number of channels when hopping patterns are randomly selected, compared to a dedicated resource allocation method, so that a larger number of second communication stations may be accommodated than that of conventional methods.

Although the above-described effects are acquired by a conventional multidimensional orthogonal hopping multiplexing communication method and apparatus (Korean Patent No. 10-0370746), the present invention can improve the entire system capability by resolving a problem of an increase in the required Eb/NO due to performance degradation caused by collisions in the conventional multidimensional orthogonal hopping multiplexing communication method and apparatus using a collision avoidance technology, in which the data of the remaining channels, other than one selected channel to be transmitted, are temporarily stored in the corresponding buffers upon the collision among hopping patterns.

Furthermore, the conventional multidimensional orthogonal hopping multiplexing communication method and apparatus generate a hopping pattern for each data symbol, whereas the present invention generates a hopping pattern for each block composed of a plurality of data symbols, so that the complexity thereof can be considerably reduced.

Figure 1A:
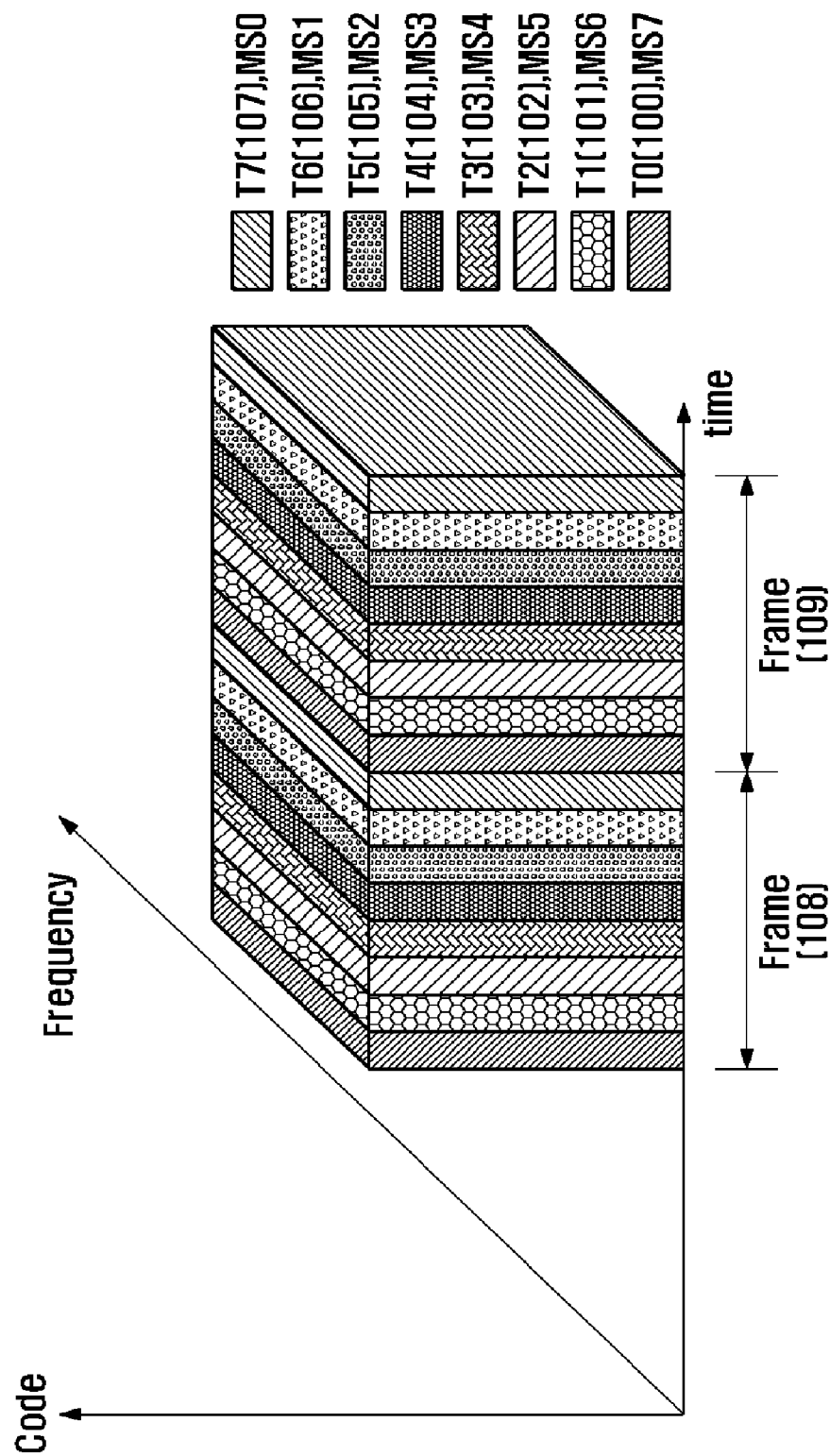
FIG. 1a is a diagram illustrating a concept in which total time intervals used as orthogonal resources are divided into basic time blocks and assigned to second communication stations in a conventional OTDM.
Figure 1B:
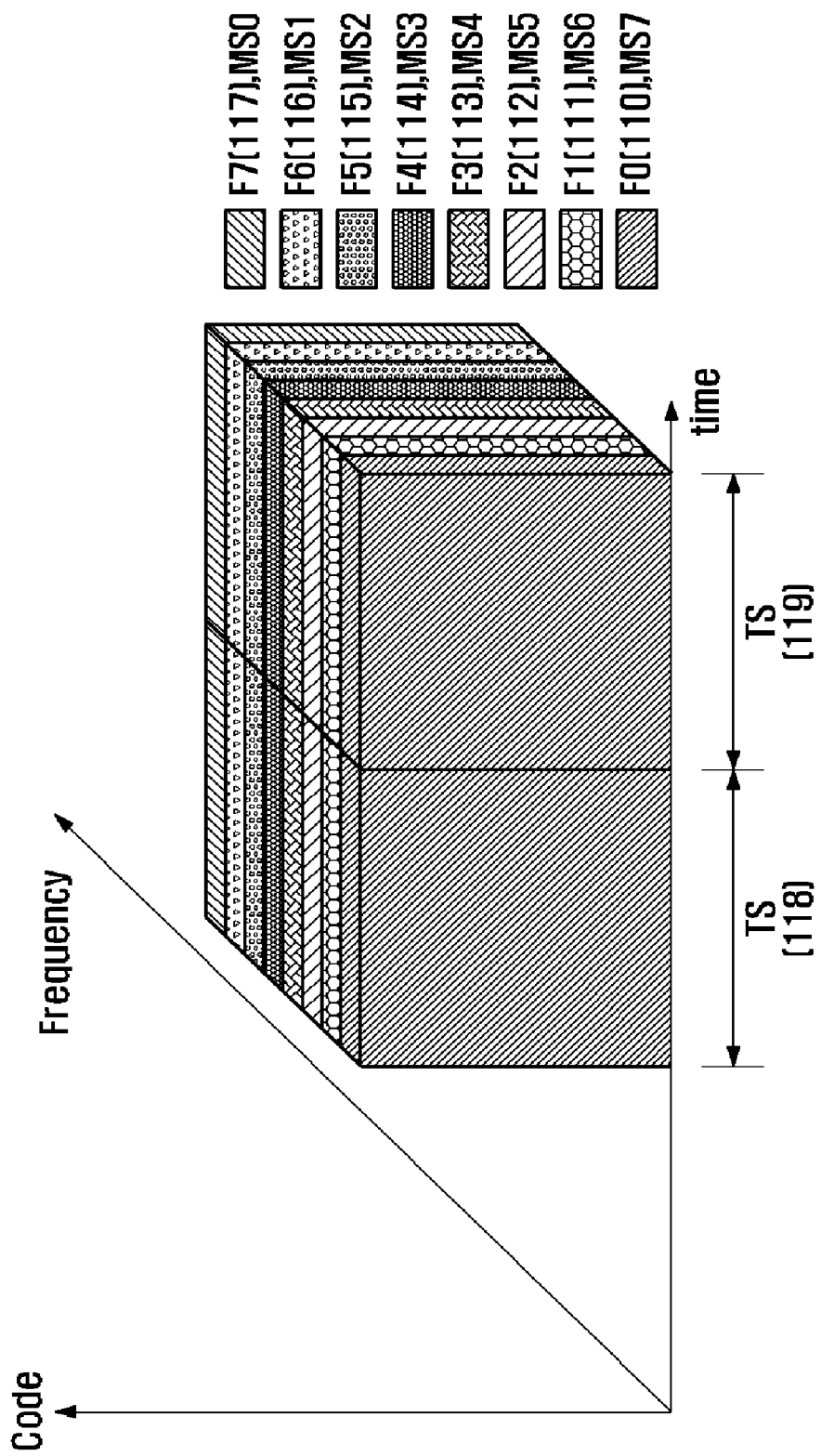
FIG. 1b is a diagram illustrating a concept in which total frequency bands used as orthogonal resources are divided into basic frequency bands and assigned to second communication stations in a conventional OFDM.
Figure 1C:
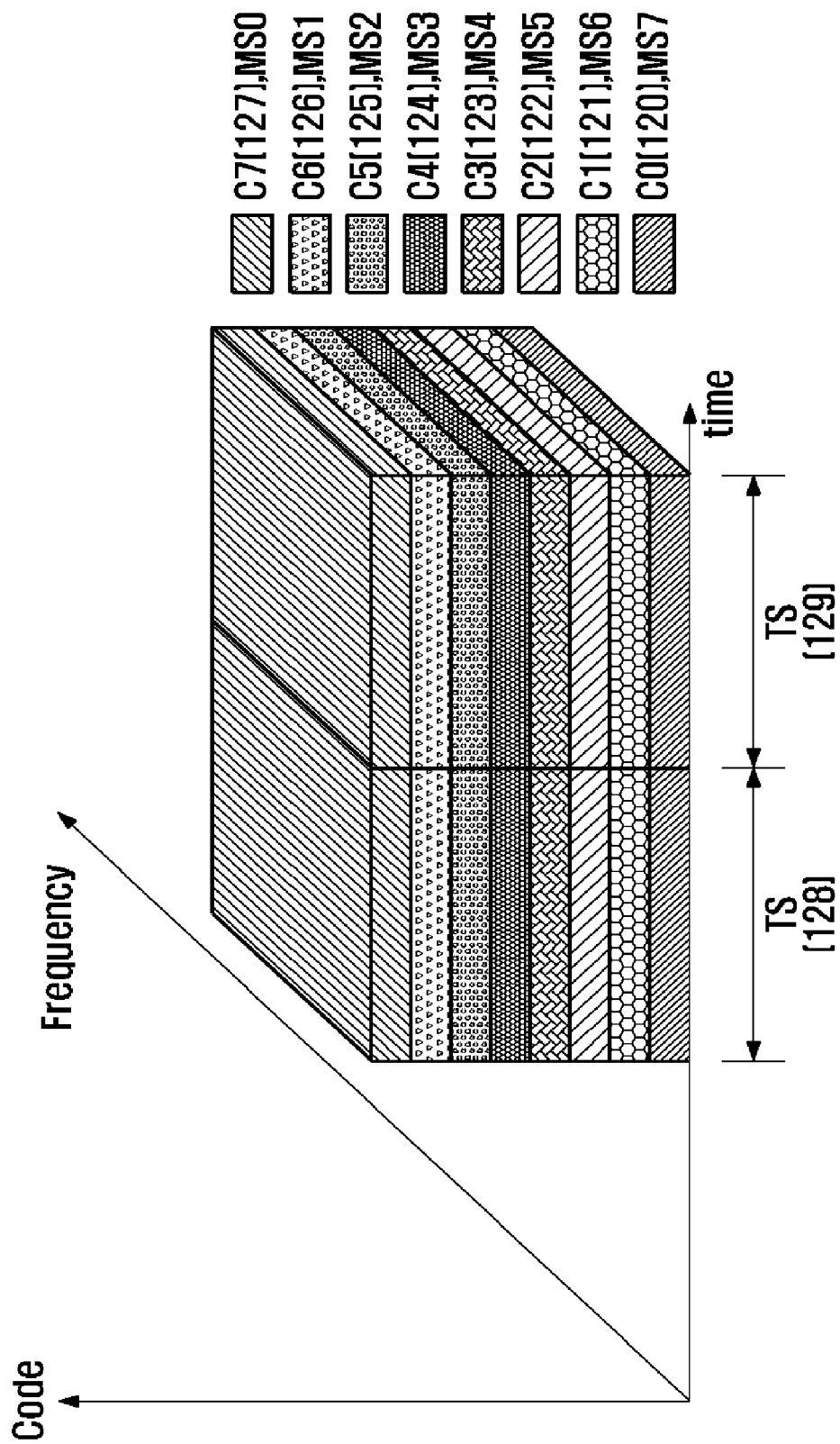
FIG. 1c is a diagram illustrating a concept in which total orthogonal codes used as orthogonal resources are divided into basic orthogonal code blocks and assigned to second communication stations in a conventional OCDM.

DESCRIPTION OF REFERENCE CHARACTERS
OF PRINCIPAL ELEMENTS

201: encoder 202: interleaver
203: symbol mapper 204: symbol demapper
205: deinterleaver 206: decoder

BEST MODE

In order to accomplish the above objective of the present invention, the present invention provides a method and apparatus which distinguish channels according to an orthogonal resource block hopping pattern, thereby performing a statistical multiplexing method and, when hopping pattern collisions occur., Only one of multiple colliding channels is allowed to transmit the message and the other messages to the remaining channels are delayed for transmission in later time slots in order to prevent erroneous reception caused by the pattern collisions which may occur due to random hopping patterns, unlike a conventional system in which limited orthogonal resources are assigned in a dedicated manner for calls.

Furthermore, the present invention provides a method and apparatus which divide and manage two resource groups: orthogonal resource groups allocated by an assigned hopping pattern and orthogonal resource groups allocated in a dedicated manner as shown in conventional methods. Therefore, the present invention can coexist with conventional systems.

Mode for Invention

The construction and operation of embodiments of the present invention are described in detail with reference to the accompanying drawings below.

The present invention divides all available orthogonal resources into Basic Orthogonal Resource Blocks (BORBs) and distinguishes channels with assigned hopping patterns indicating the hopping among the BORBs for each predetermined time, and assigns one or several channels to each second communication station depending on the amount of transmitted messages in order to reduce a waste of orthogonal resources occurring in the conventional multiplexing method, and accommodates many more users.

Figure 4A:
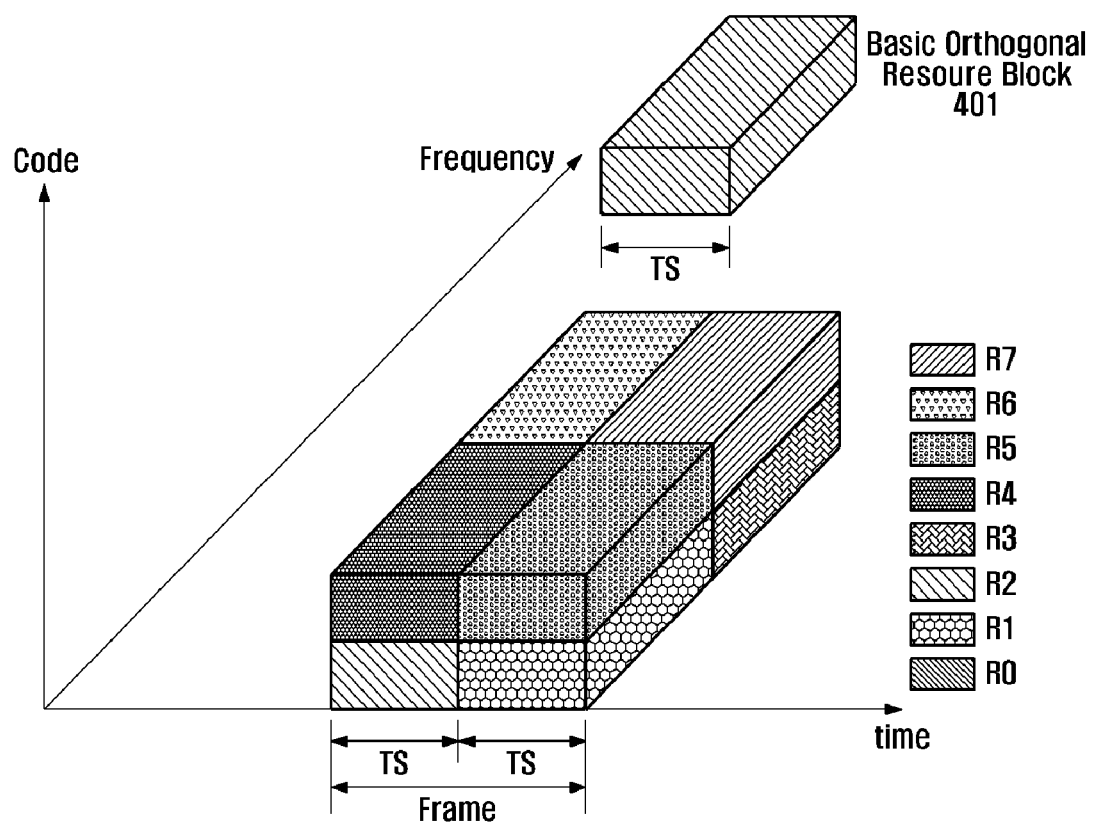
FIG. 4a is a diagram illustrating a concept in which a basic orthogonal resource block is set using various resources such as time slots, frequency bands, and orthogonal codes according to the present invention, and the entire resources are divided based on the basic orthogonal resource block.
Figure 4B:
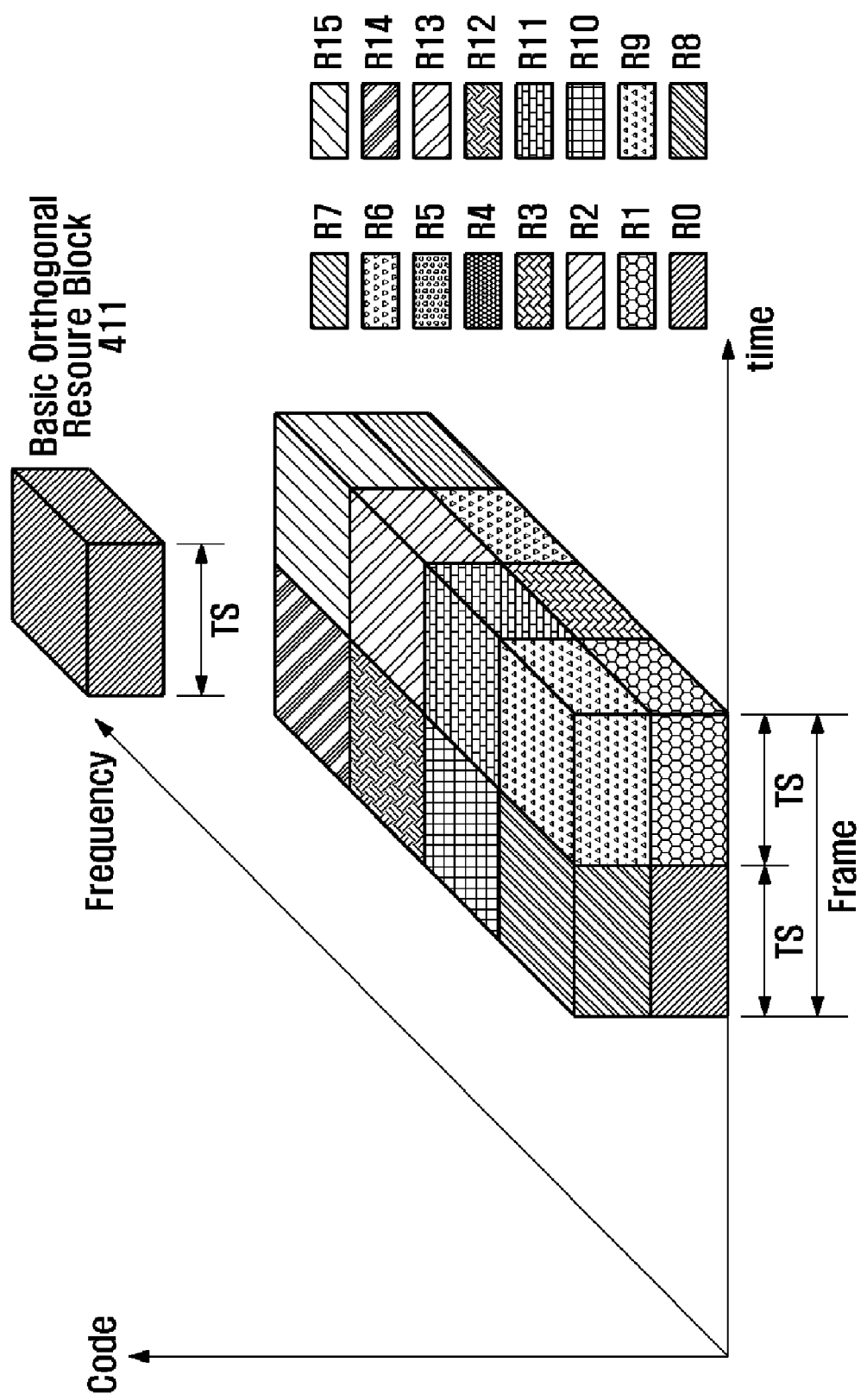
FIG. 4b is a diagram illustrating a concept in which a basic orthogonal resource block is set using various resources such as time slots, frequency bands, and orthogonal codes according to the present invention, and the entire resources are divided based on the basic orthogonal resource block.
Figure 4C:
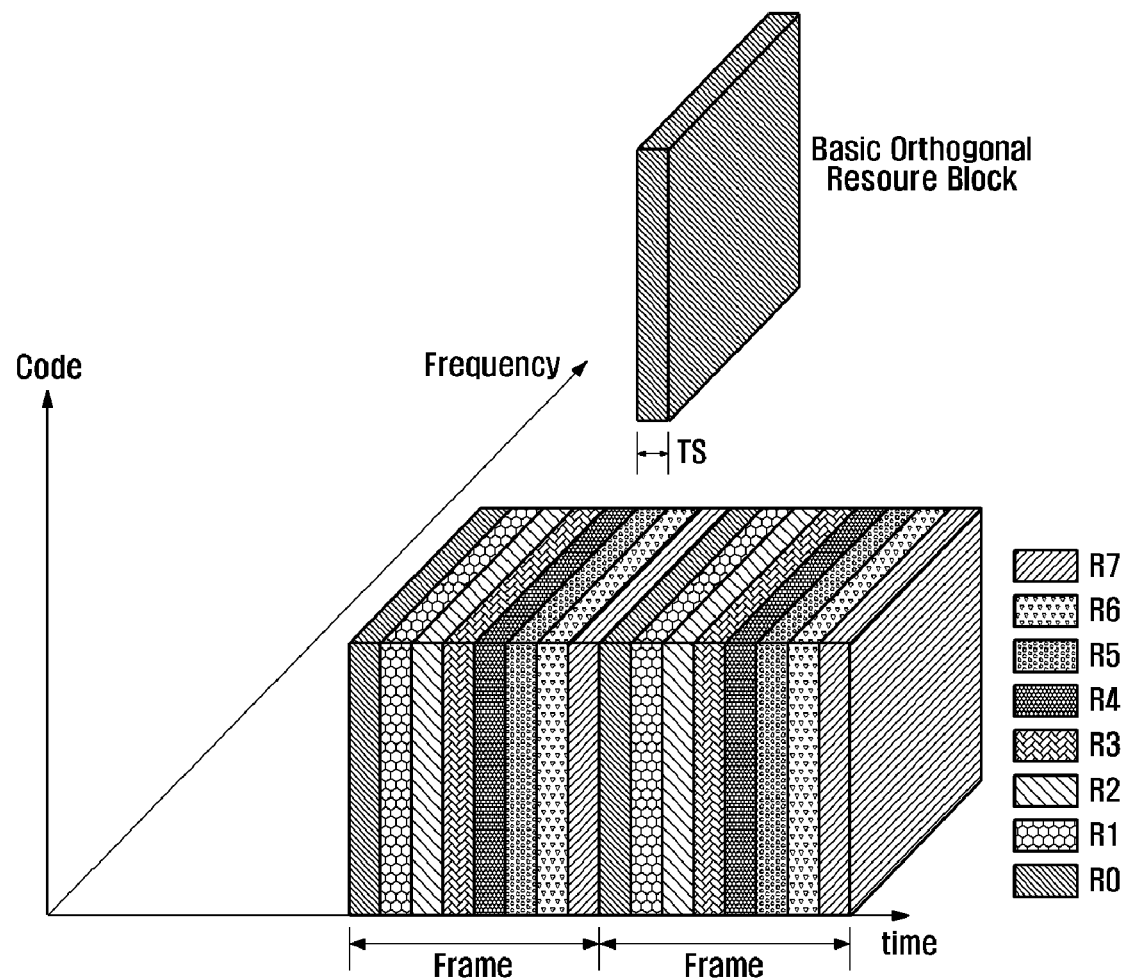
FIG. 4c is a diagram illustrating a concept in which a time slot according to the present invention is set as a basic orthogonal resource block, and the entire resources are divided based on the basic orthogonal resource block.
Figure 4D:
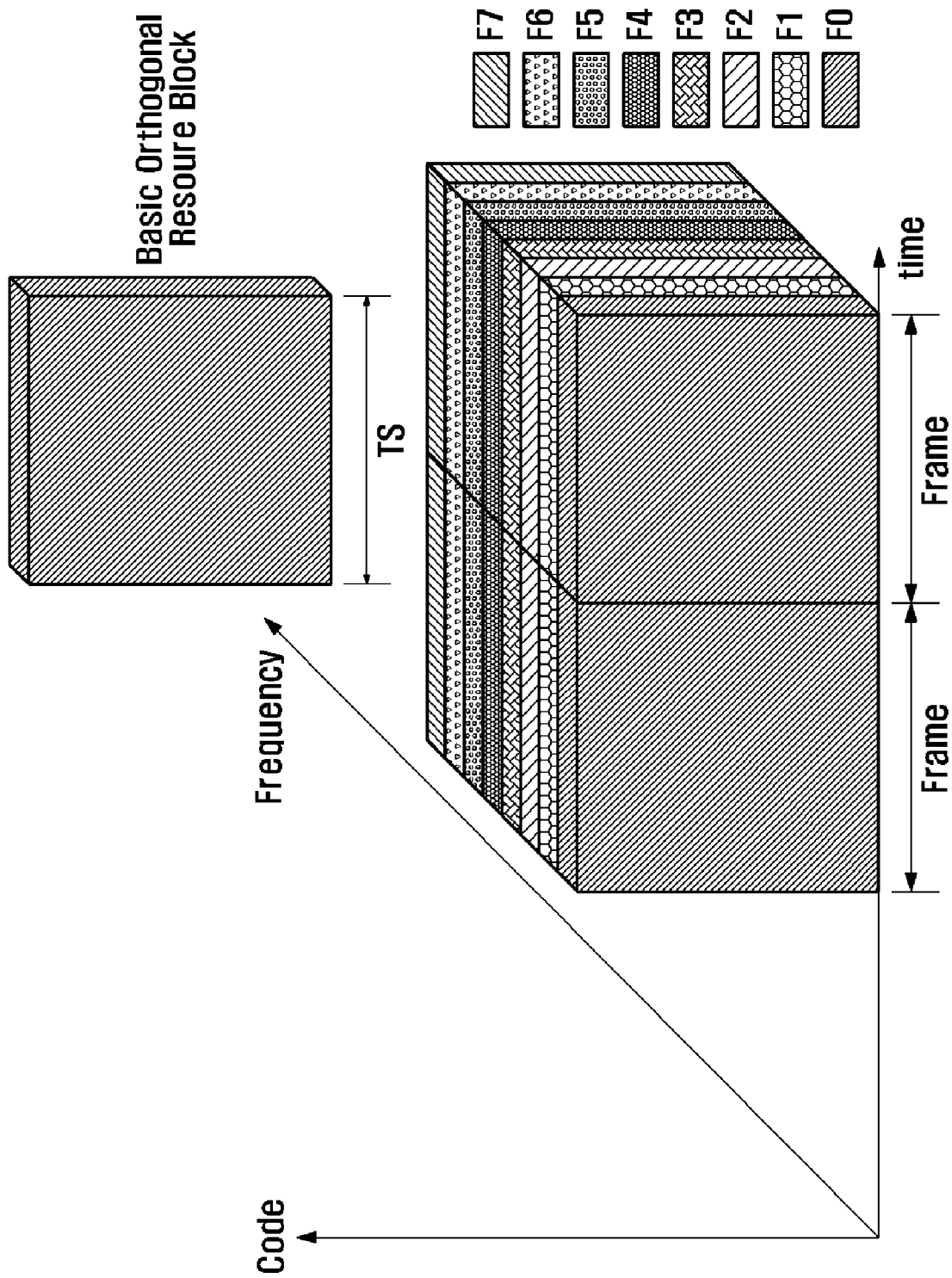
FIG. 4d is a diagram illustrating a concept in which a frequency band according to the present invention is set as a basic orthogonal resource block and the entire resources are divided based on the basic orthogonal resource block.
Figure 4E:
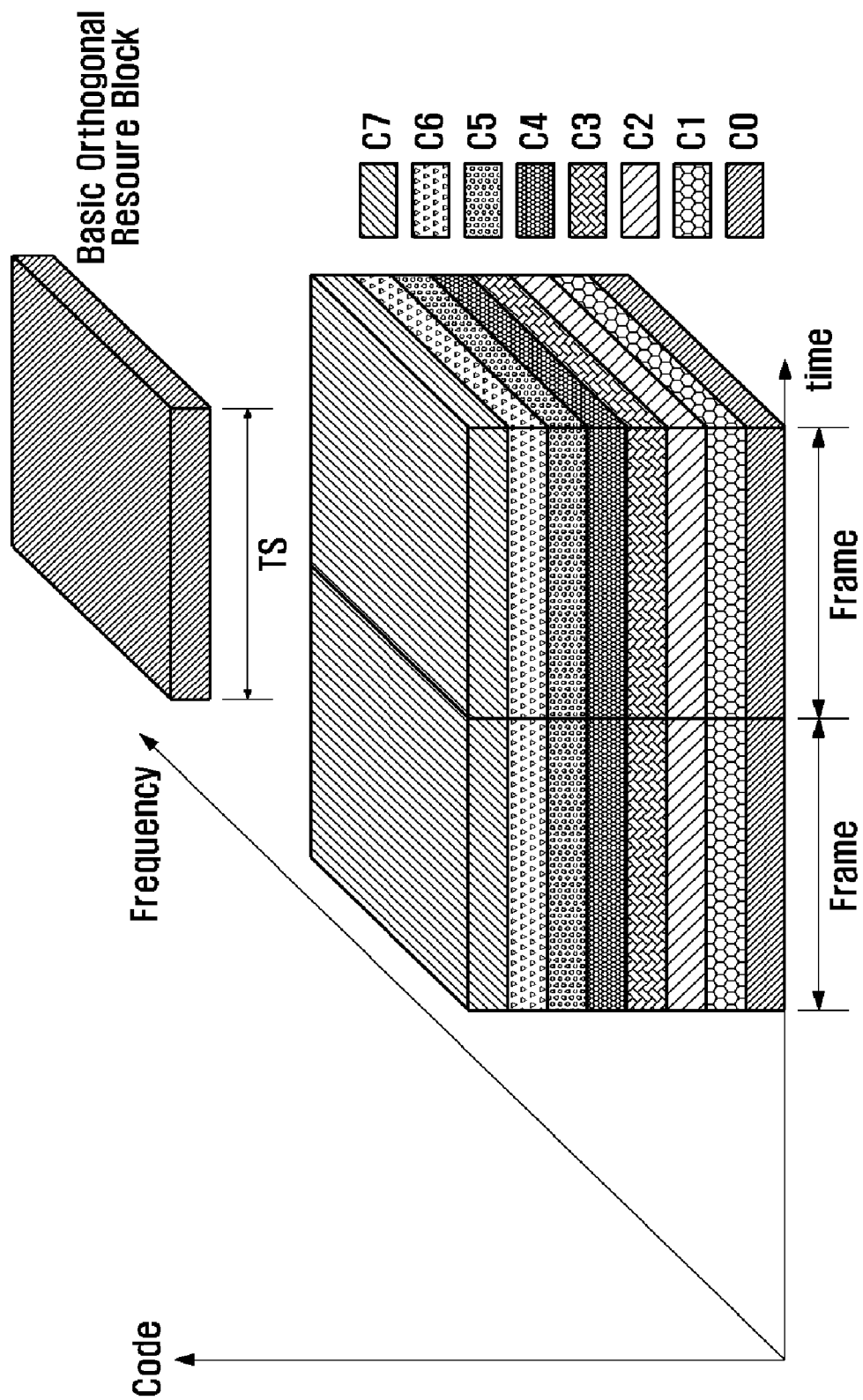
FIG. 4e is a diagram illustrating a concept in which an orthogonal code according to the present invention is set as a basic orthogonal resource block, and the entire resources are divided based on the basic orthogonal resource block.

The orthogonal resource refers to a means capable of carrying and transmitting symbols, which are converted into a message through a decoder, when a message is transmitted from a first communication station to a second communication station. For example, in a conventional OFDM, frequency bands can be considered as resources. The BORB refers to the block of resources sufficient to carry one or more symbols. For example, if frequency bands are only used as resources, one frequency band is a BORB when the available frequency bandwidth is divided into a plurality of frequency bands. At this time, the number of symbols which the BORB can carry is determined depending on the size(bandwidth) of the divided frequency band and the renewal cycle of the hopping pattern among the BORBs. The BORB can be consisted of a combination of orthogonal resources, such as time slots and orthogonal codes. For example, FIGS. 4a and 4b are diagrams illustrating a BORB that is constructed by combining three orthogonal resources of time slots, frequency bands and orthogonal codes, and illustrate that all the available orthogonal resources are divided into BORBs. Furthermore, FIGS. 4a and 4b illustrate that, although the size of all available orthogonal resources is the same, the number of BORBs to be used in a hopping pattern can be changed by changing the size of the BORBs. That is, FIG. 4b illustrates that the size of a BORB 411 decreases by half of that of a BORB 401 and the number of BORBs increases twice. Although the number of symbols to be transmitted through each BORB decreases when the size of the BORB decreases, the number of BORBs which can be used in a hopping pattern increases, thereby obtaining an advantage of reducing collisions among channels. In a much simpler example, when time slots are used as resources as shown in a conventional OTDM, time slots T0~T7 are BORBs as shown in FIG. 4c. When frequency bands are used as resources as shown in a conventional OFDM, frequency bands F0~F7 are BORBs as shown in FIG. 4d. Furthermore, when orthogonal codes are used as resources as shown in a conventional OCDM, orthogonal codes C0~C7 are BORBs as shown in FIG. 4e.

FIGS. 5a to 5d are diagrams illustrating examples of orthogonal resources which each of the second communication stations MS0~MS7 uses in the orthogonal resource block hopping multiplexing method according to the present invention.

Figure 3A:
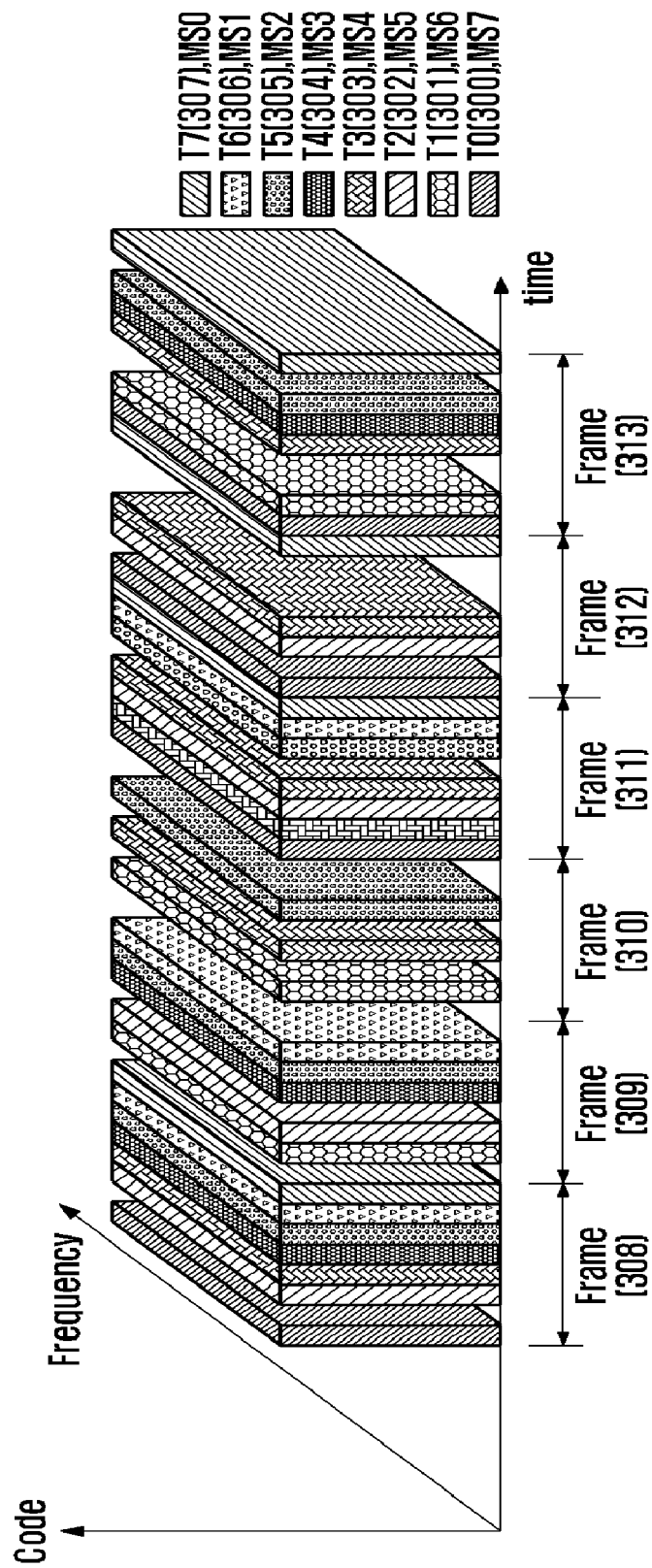
FIG. 3a is a conceptual diagram illustrating the utilization of TDM channels of second communication stations in consideration of the data activity in a conventional OTDM.
Figure 5A:
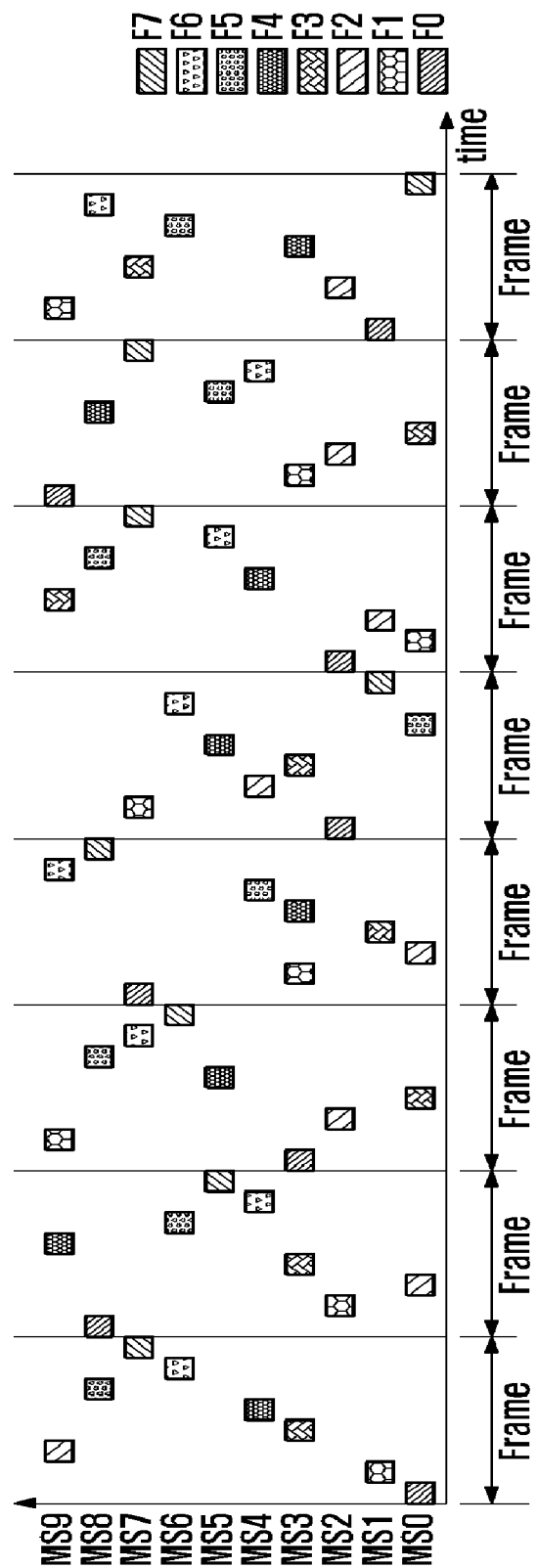
FIG. 5a is a diagram illustrating a concept in which each second communication station establishes a channel by hopping among basic time slots for each frame when time slots are used as resources according to the present invention.

FIG. 5a is a diagram illustrating a case in which time slots are used as orthogonal resources. Time slots, which each of the second communication stations uses, are not fixed as shown in FIG. 3a, and are changed(hopped) every frame interval.

Figure 3B:
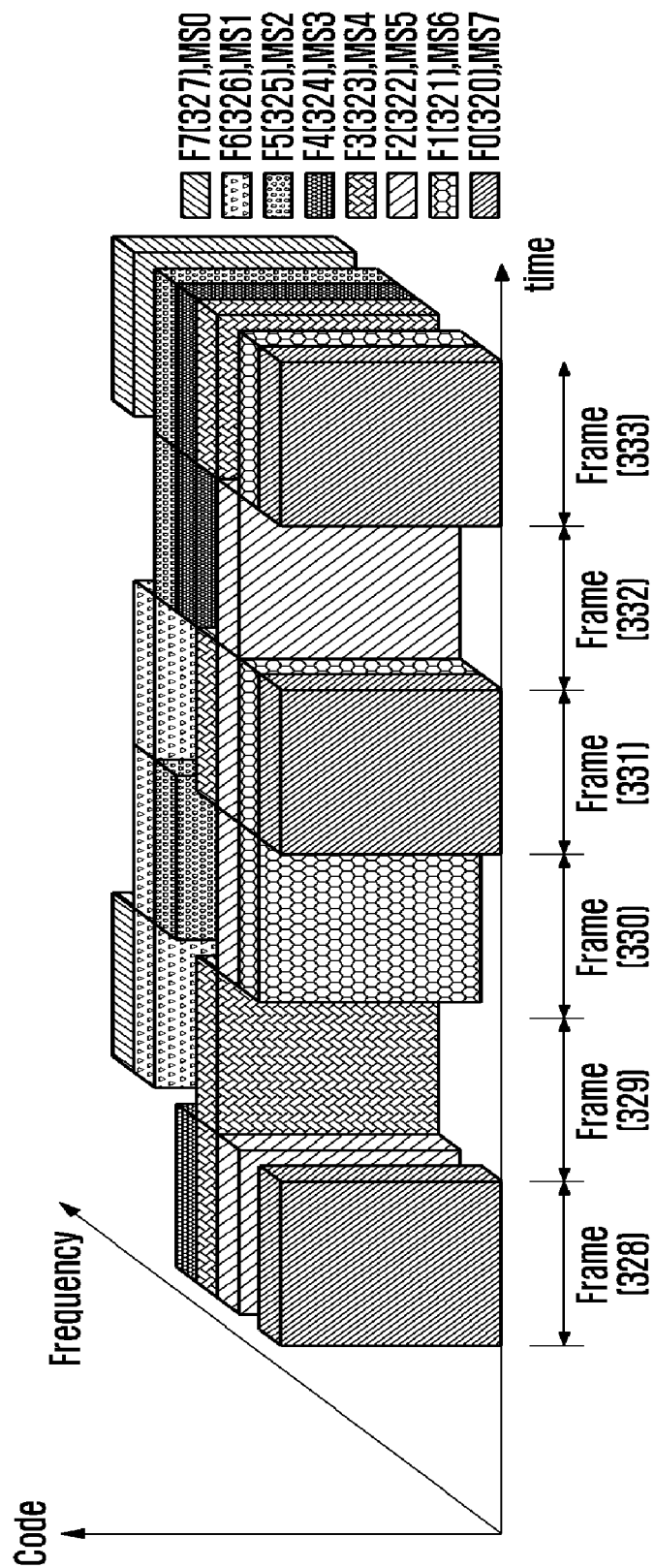
FIG. 3b is a conceptual diagram illustrating the utilization of sub-carrier channels of second communication stations in consideration of the data activity in a conventional OFDM.
Figure 5B:
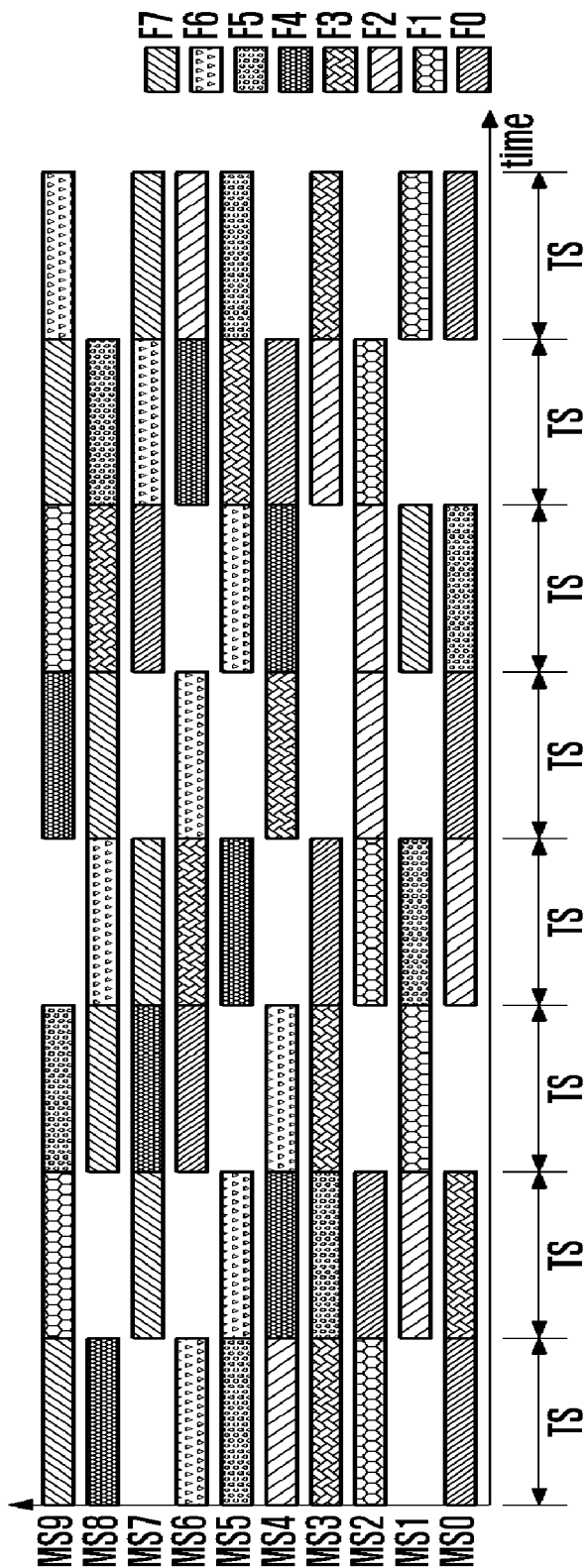
FIG. 5b is a diagram illustrating a concept in which each second communication station establishes a channel by hopping among basic frequency bands for each time slot when frequency bands are used as resources according to the present invention.

FIG. 5b is a diagram illustrating a case in which frequency bands are used as orthogonal resources. Frequency bands, which each of the second communication stations uses, are not fixed as shown in FIG. 3b, and can be changed(hopped) every time slot.

Figure 3C:
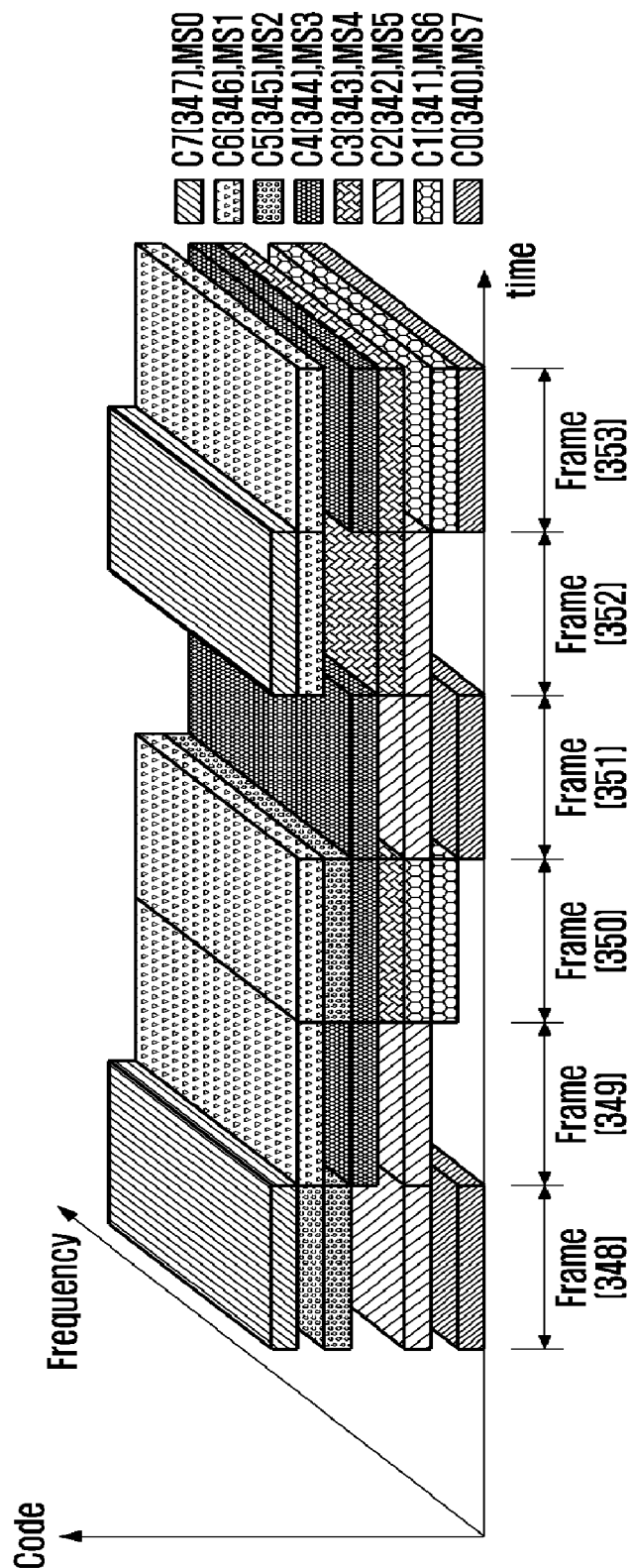
FIG. 3c is a conceptual diagram illustrating the utilization of orthogonal code channels of second communication stations in consideration of the data activity in a conventional OCDM.
Figure 5C:
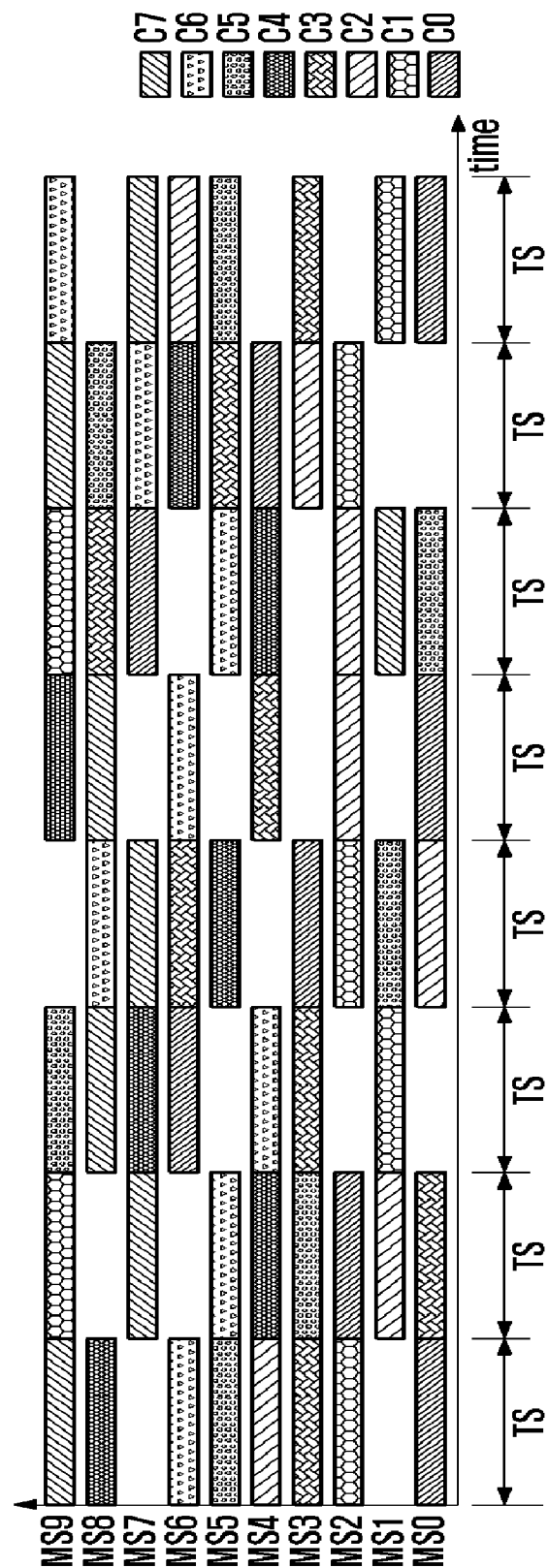
FIG. 5c is a diagram illustrating a concept in which each second communication station establishes a channel by hopping among basic code blocks for each time slot when codes are used as resources according to the present invention.

FIG. 5c is a diagram illustrating a case in which orthogonal codes are used as orthogonal resources. Orthogonal codes, which each of the second communication stations uses, are not fixed as shown in FIG. 3c, and can be changed(hopped) every time time slot.

Figure 5D:
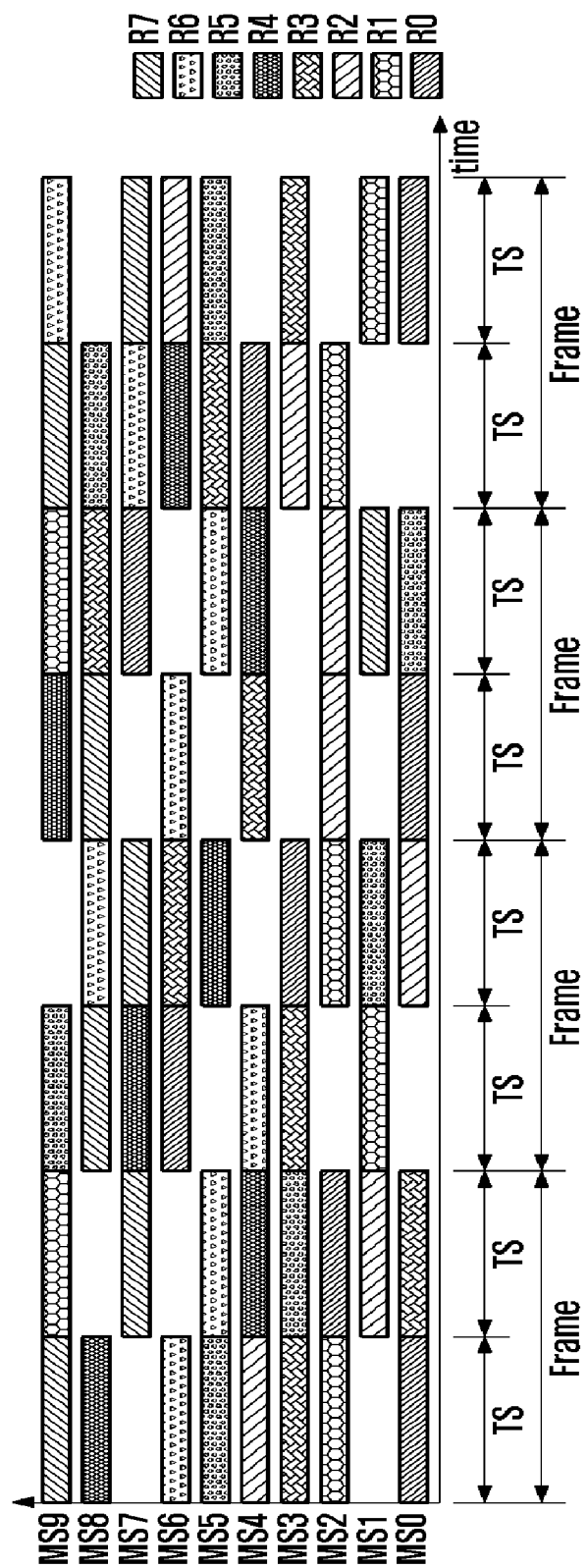
FIG. 5d is a diagram illustrating a concept in which each second communication station establishes a channel by hopping among basic orthogonal resource blocks when orthogonal codes, frequency bands and time slots of FIG. 4a are used as resources according to the present invention.

FIG. 5d is a diagram illustrating orthogonal resource blocks used by each of the second communication stations when BORBs suggested in FIG. 4b are allocated according to a hopping pattern.

Figure 5E:
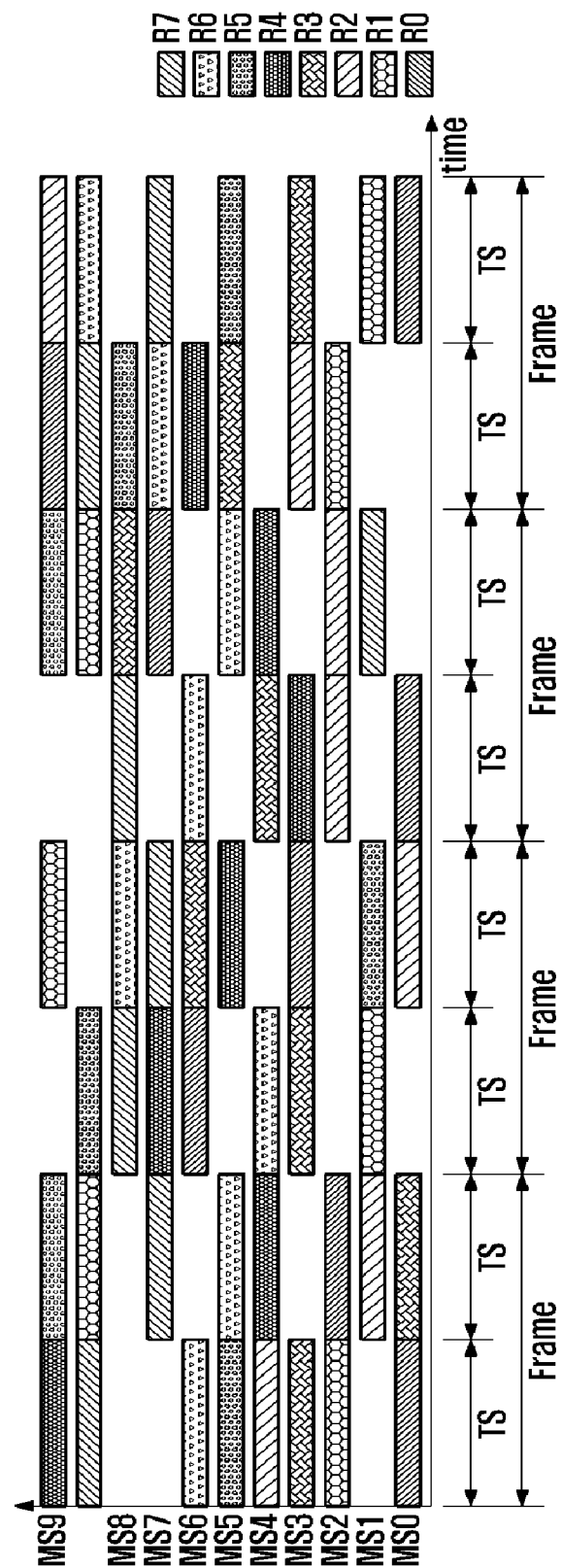
FIG. 5e is a diagram illustrating a concept in which one second communication station uses a plurality of basic orthogonal resource blocks when orthogonal codes, frequency bands and time slots of FIG. 4a are used as resources according to the present invention.

Although, in FIGS. 5a to 5d, one BORB is assigned every time slot, two or more several BORBs may be used in a time slot if the amount of messages transmitted to a specific second communication station MS9 is large, as shown in FIG. 5e. As illustrated in FIGS. 5a to 5d, each second communication station uses orthogonal resources selected by a hopping pattern for each time slot only when a message to be transmitted exists.

If orthogonal resource blocks to be used by second communication stations are randomly selected for each time slot, multiple communication stations are selected to use the same BORBs in some time slot. In this case, if messages are transmitted to all of the several communication stations selected to use the same BORB, then a collision occurs in a transmission medium, so that messages are not successfully delivered to the target second communication stations. In order to prevent this phenomenon, when a collision among selected BORBs occurs, one of the second communication stations experiencing the collision is selected and the messages are transmitted to the selected second station, and the remaining messages are delayed for transmission to the remaining second communication stations in following subsequent time slots.

Figure 6:
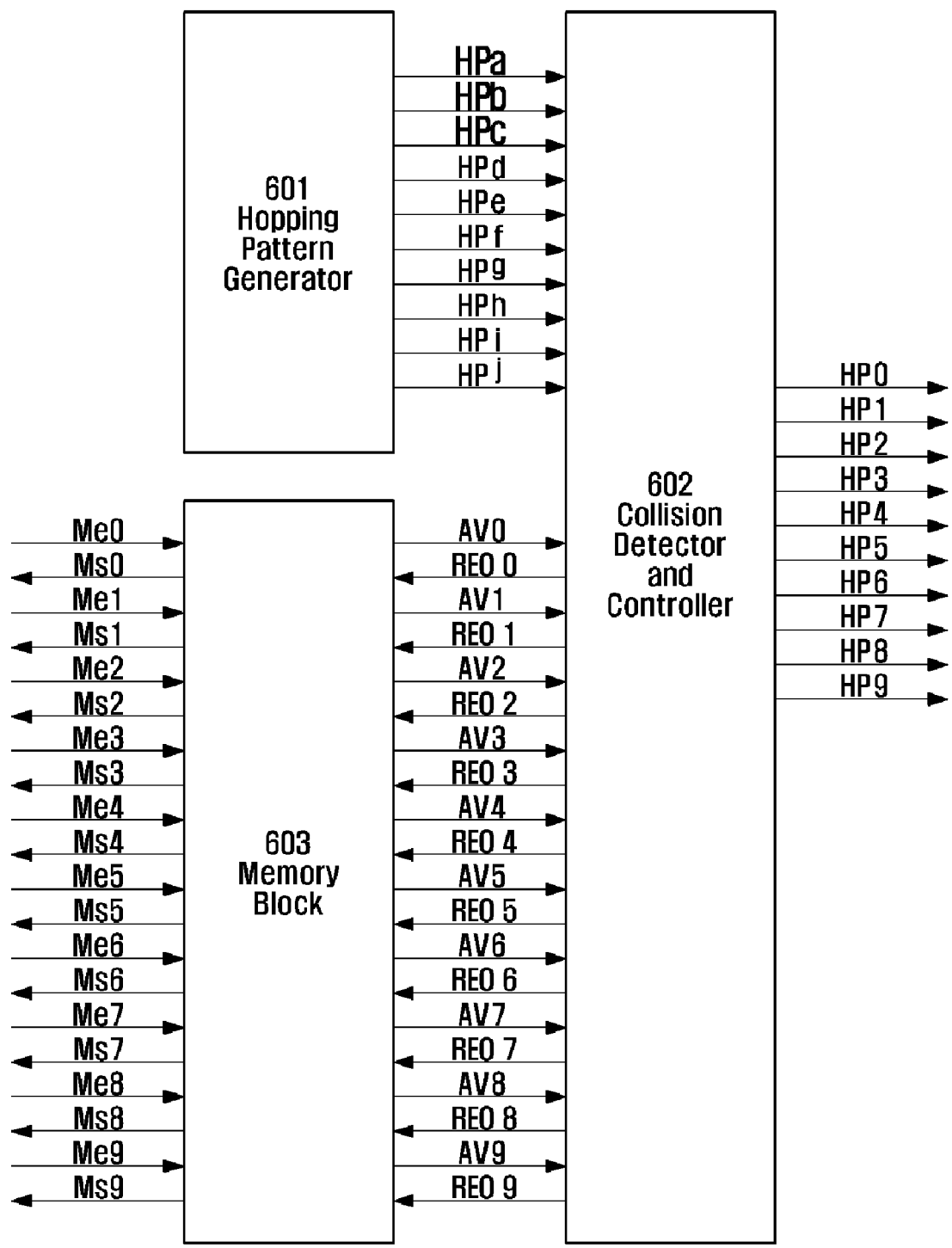
FIG. 6 is a conceptual diagram illustrating functions which must be added to the first communication station of the prior art in order to implement a communication system according to an embodiment of the present invention.

FIG. 6 is a diagram illustrating an orthogonal resource block hopping pattern generator 601 for generating a hopping pattern for each second communication station, a collision detector and controller 602 for detecting collisions among orthogonal resource blocks and selecting one of the colliding second communication stations, and a memory block 603 for temporarily storing messages before transmission, which is additionally required in order to implement an orthogonal resource block hopping multiplexing method.

Although the number of second communication stations is 10 in FIG. 6, any other number of second communication stations can be possible. The memory block has separated areas for respective second communication stations. The memory block informs the collision detector and controller of indication Av0~Av9 that messages Me0~Me9 to be transmitted exist, and delivers the messages Ms0~Ms9 when the collision detector and controller requests to output the messages. The hopping pattern generator 601 generates a hopping pattern indicating the BORB numbers Hpa~HPj used by respective second communication stations for each time slot and informs the collision detector and controller of the BORB numbers.

Figure 7:
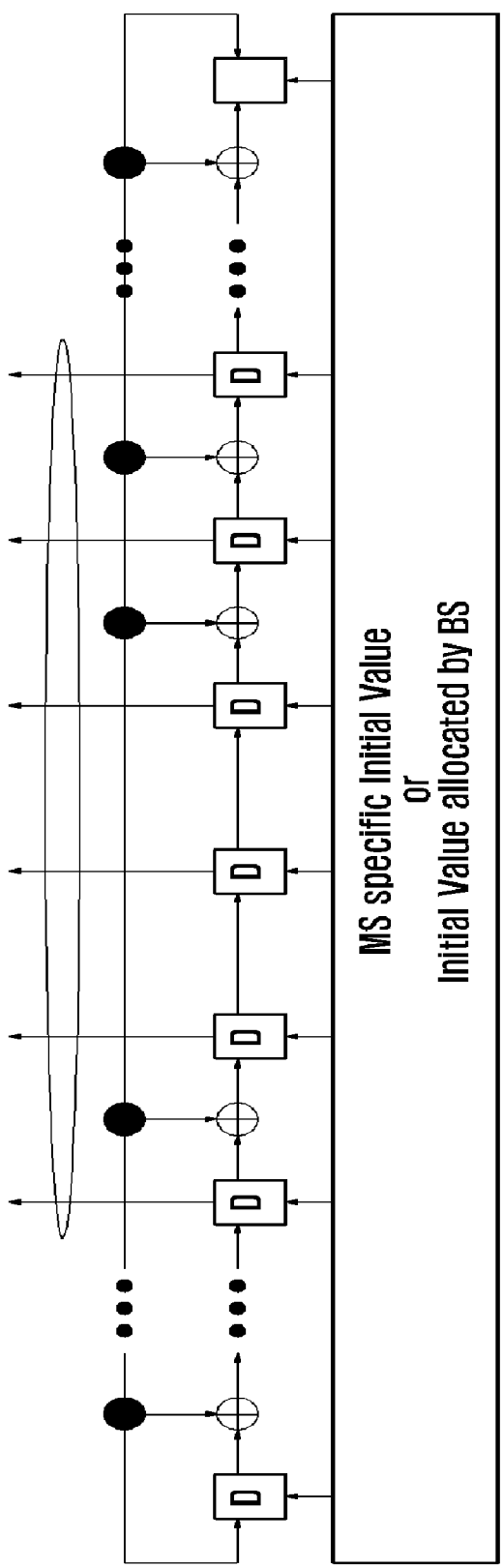
FIG. 7 is a diagram illustrating a hopping pattern generator according to an embodiment of the present invention.

FIG. 7 shows an example of an orthogonal resource block hopping pattern generator. The hopping pattern generator generates hopping patterns using a pseudo random noise(PN) sequence generator. Orthogonal resource block hopping patterns for a plurality of second communication stations are generated using a single PN sequence generator, or a single PN sequence generator exists for one second communication station. In this case, the initial value of the PN sequence generator is set according to the unique values of respective second communication stations, or a first communication station sets different initial values for respective second communication stations at the initial setup stage of a new call or a session, and thus, it generates different hopping patterns for respective second communication stations.

The collision detector and controller detects a collision among orthogonal resource blocks using the BORB numbers Hpa~HPj and the signals Av0~Av9, indicating that messages to be transmitted exist, received from the hopping pattern generator and the memory block. When a collision occurs, the collision detector and controller selects one second communication station for transmitting the corresponding message in the current time slot and the remaining second communication stations for delaying the remaining messages in later time slots, and generates signals REQ0~REQ9 requesting the output of messages from the memory block, and control signals HP0~HP9 indicating a BORB to be used by each message.

Figure 8:
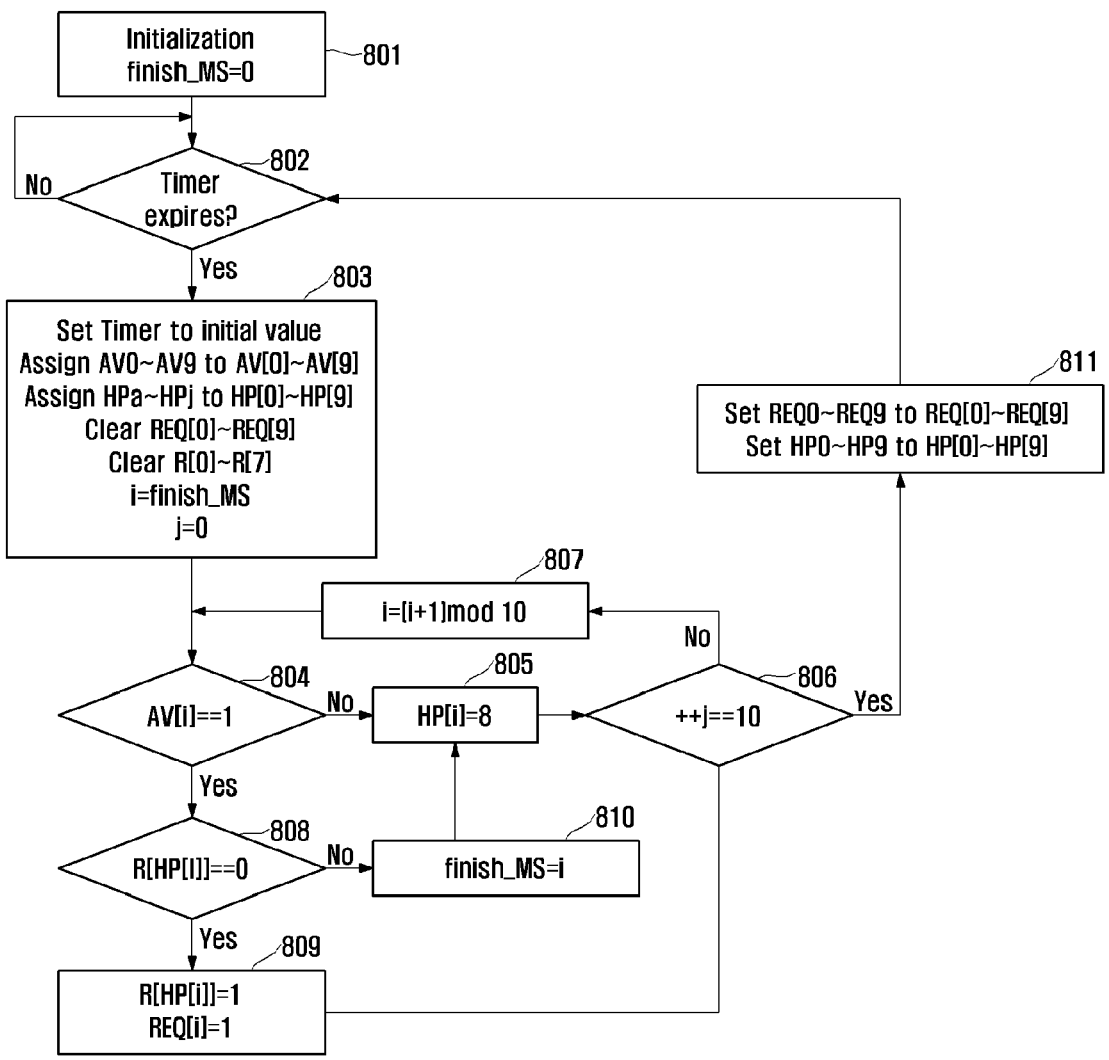
FIG. 8 is the flow diagram of a program for implementing a hopping pattern collision detector and controller according to an embodiment of the present invention.

FIG. 8 shows an implementation algorithm of the collision detector and controller. In this figure, 10 second communication stations use 8 orthogonal resource blocks as an example. The algorithm needs to be modified depending on the number of second communication stations and the number of orthogonal resource blocks. The implementation algorithm starts at an initialization step 801. During the initialization step, basic resource blocks are transmitted during a time slot and the number of second communication stations initially examined is determined. Next, since the hopping pattern value is changed every time slot, occurrence of a collision is examined every time slot in the algorithm. Therefore, it is determined that a certain amount of time has lapsed (i.e, a timer expires) at step 802. After a certain amount of time has lapsed (the timer expires), the timer is again set to an initial value, and internal variables are determined at step 803. BORB numbers Hpa~HPj and signals AV0~AV9 indicating that messages to be transmitted exist, received from the hopping pattern generator and the memory block, are set as internal variables AV[9:0] and HP[9:0]. Furthermore, signals REQ[9:0] requesting the output of messages to the memory block, and a variable R[7:0] indicating that basic resource blocks are used, are set to 0, and the number of a designated second communication station is also set to internal variable i. In this case, a variable j indicates the number of examinations for hopping patterns of second communication stations, and it is also set to 0. At step 804, it is checked whether a message to be transmitted to a second communication station, currently set in the internal variable i, exists. If the message does not exist, the internal variable HP[i] is set to 8 at step 805. At this time, setting HP[i] to 8 implies that the second communication station represented by i will not use any resources during this time slot, and any value different from 0~7 may be used in this case. Thereafter, variable j is incremented and then it is checked whether variable j have a value of 10 at step 806. If variable j has a smaller value than 10, this means that hopping patterns for all second communication stations are have not been examined yet. In this case, the internal variable i is set in the number of a next second communication station at step 807, and it is again checked whether a message to be transmitted to the second communication station currently set in the internal variable i exists at step 804. If the message exists, it is checked whether the number of a basic resource block to be used by the second communication station, HP[i], has already been used by another second communication station at step 808. If used, an internal variable finish_MS is set to the value i at step 810 so that examination for a collision starts from the second communication station, i, in the next time slot, and the process returns to step 805. If not used, this implies that the basic resource block can be used by the second communication station, i. The variable R[HP[i]], indicating whether the basic resource block represented by the number HP[i] is used, is set to 1, so that it is to indicate that the basic resource block represented by the number HP[i] is used. Furthermore, the internal variable REQ[i] is set to 1 so that a message can be transmitted to the second communication station, I, at step 809. Thereafter, the process goes to step 806, and whether the value of variable j is 10 is examined. If the value of variable j is 10, this implies that hopping patterns for all second communication stations have been examined. Therefore, the process goes to step 811, and then REQ9~REQ0 and HP9~HP0 are set to internal variables REQ[9:0] and HP[9:0], respectively, so that information about the numbers of second communication stations to which messages are destined, and information about the numbers of basic resource blocks to be used by respective second communication stations, are delivered to the memory block. Thereafter, the process is returned to step 802, and waits until a next time slot. In the implementation example of FIG. 8, a second communication station to which a message is transmitted is selected among all the colliding second communication stations in a round robin fashion. A selection method of providing high priorities to second communication stations delayed due to previous collisions can be used, and any selection method may be used.

Figure 9A:
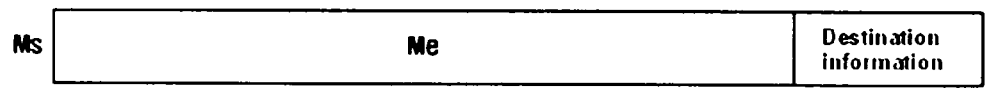
FIG. 9a is a diagram illustrating a concept in which destination information is inserted into messages in order to notify the destination of messages according to the present invention.

Furthermore, a second communication station, which receives a message transmitted from a first communication station, must know whether the message is destined to itself or another second communication station when a collision occurs even if the message is transmitted with basic resource blocks in the current time slot. Therefore, the first communication station must transmit a control signal indicating the destination of each message. One of methods of transmitting a control signal is to insert a specific signal for distinguishing second communication stations that receive the message, into the message to be transmitted, as shown in FIG. 9a. The location of this insertion is determined according to the agreement with the second communication stations.

Figure 9B:
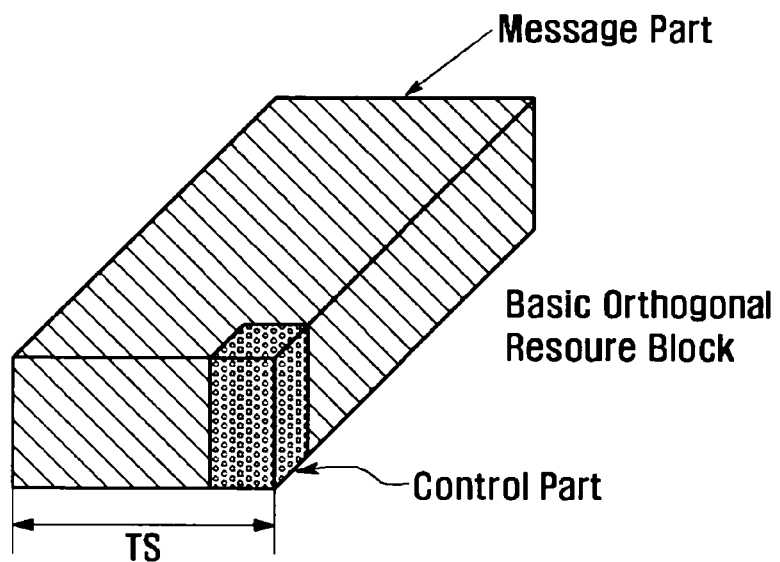
FIG. 9b is a diagram illustrating a concept in which a basic resource block is divided into a message part for transmission of messages and a control part for transmission of control signal, and destination information is inserted into the control part for transmission of control signal in order to notify the destination of messages according to the present invention.

Another method is to divide a BORB into a message part for transmitting a message and a control part for transmitting a control signal, as shown in FIG. 9b and then to carry information about a designated second communication station onto the control part for transmitting a control signal.

Furthermore, another method is to transmit all control signals which includes the information used to distinguish second communication stations using a separate channel, rather than to multiplex the control signal and the message as shown in FIG. 9b. In this case, each second communication station determines the location of a REQ signal transmitted thereto, and receives a message if the REQ signal exists in the location, or does not receive it if not.

Figure 2A:
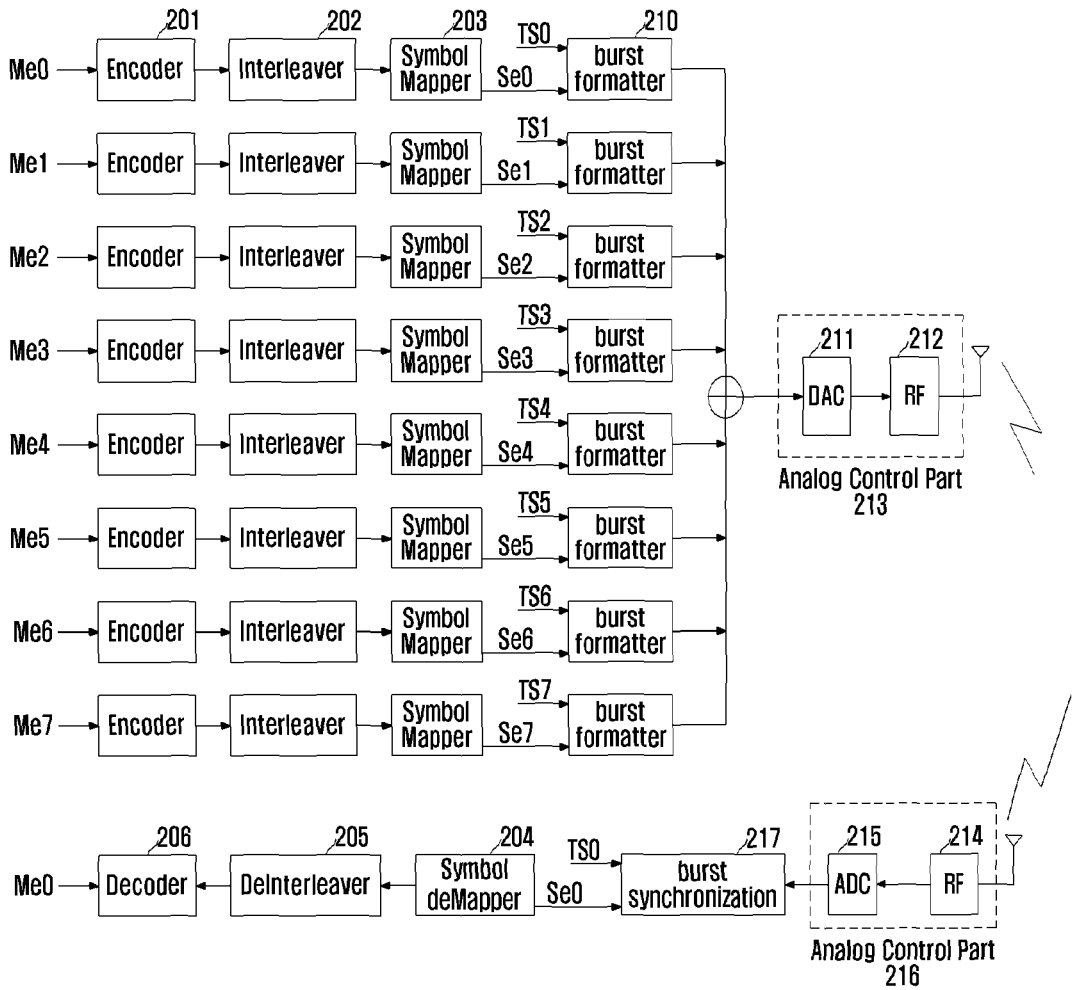
FIG. 2a is a block diagram of a transmitter and receiver in a conventional OTDM.
Figure 2B:
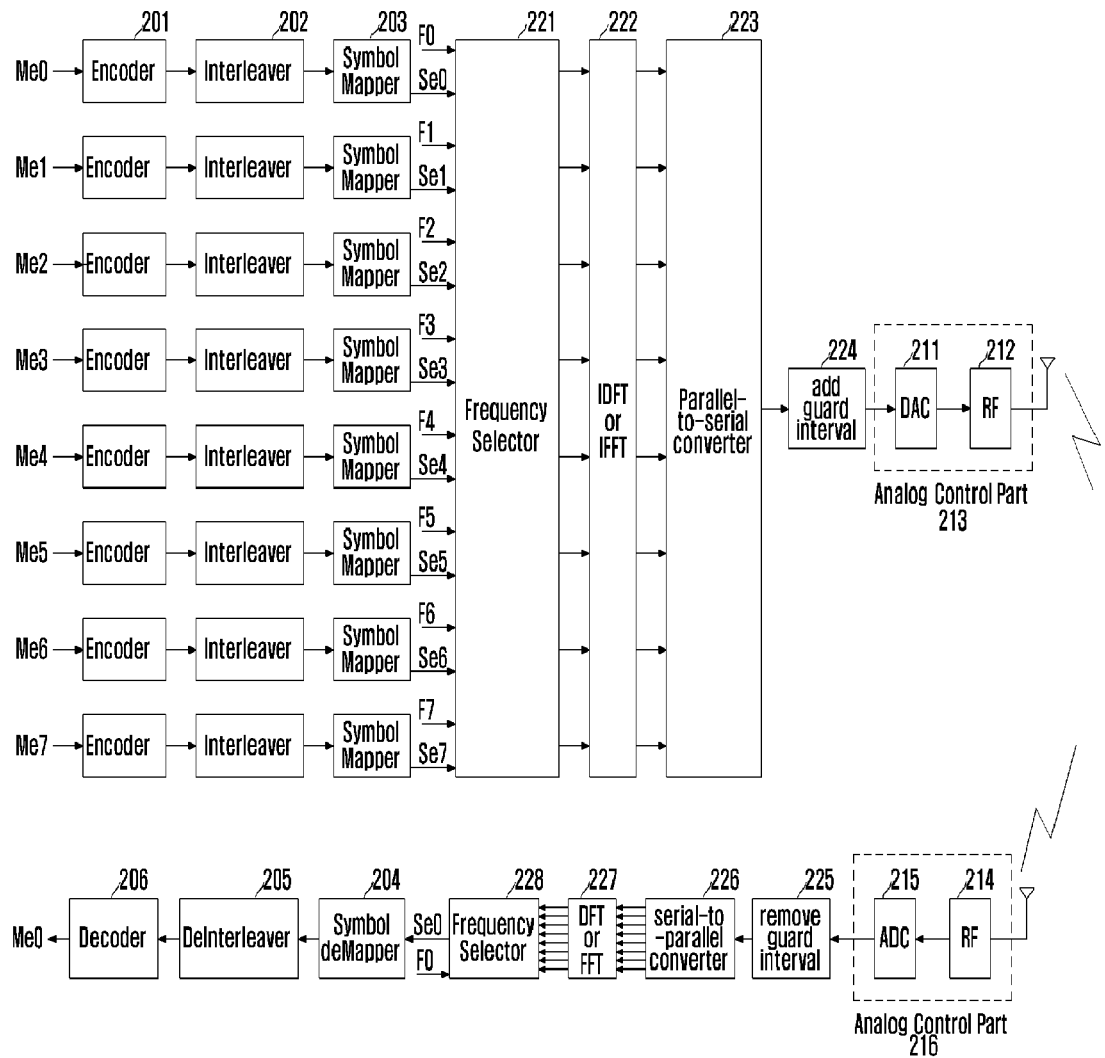
FIG. 2b is a block diagram of a transmitter and receiver in a conventional OFDM.
Figure 2C:
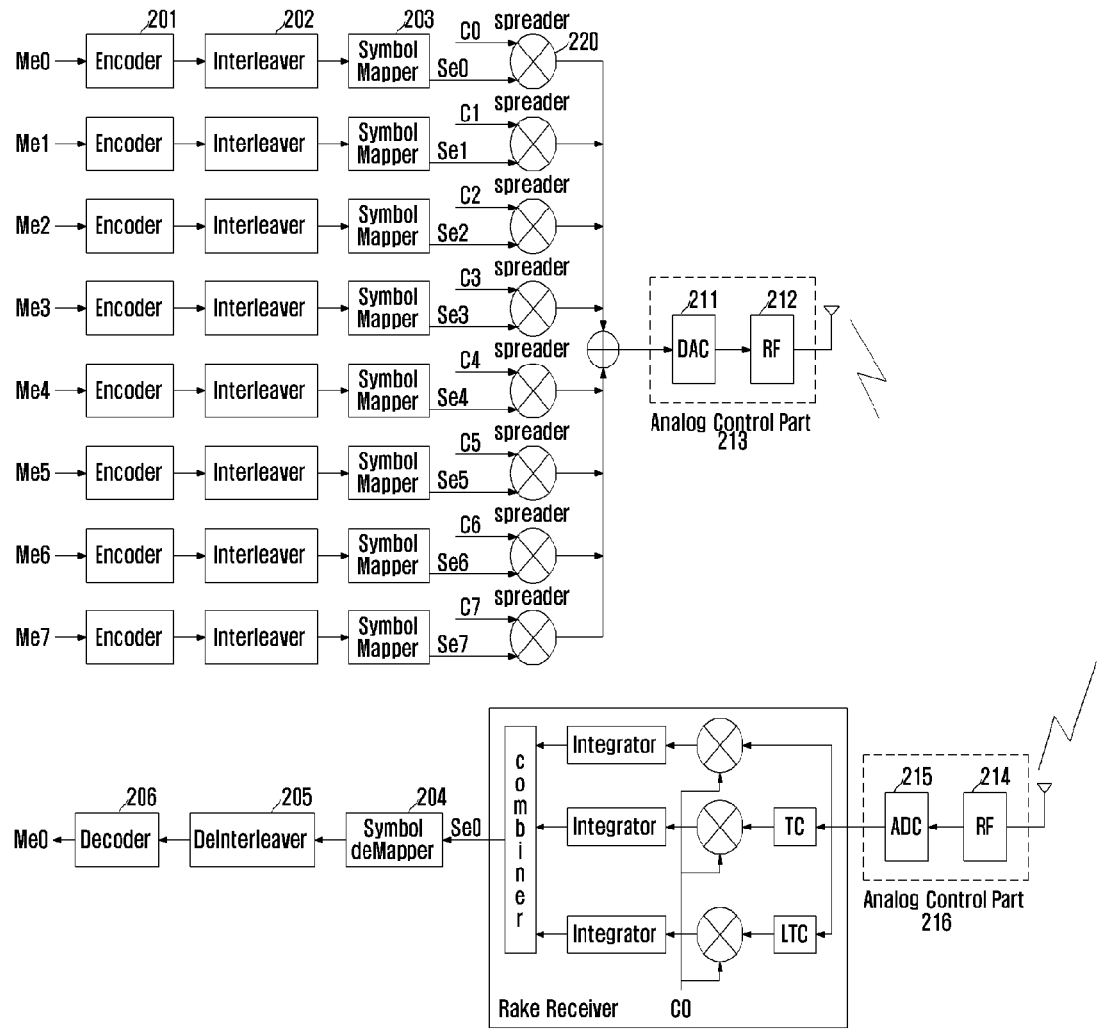
FIG. 2c is a block diagram of a transmitter and receiver in a conventional OCDM.
Figure 10A:
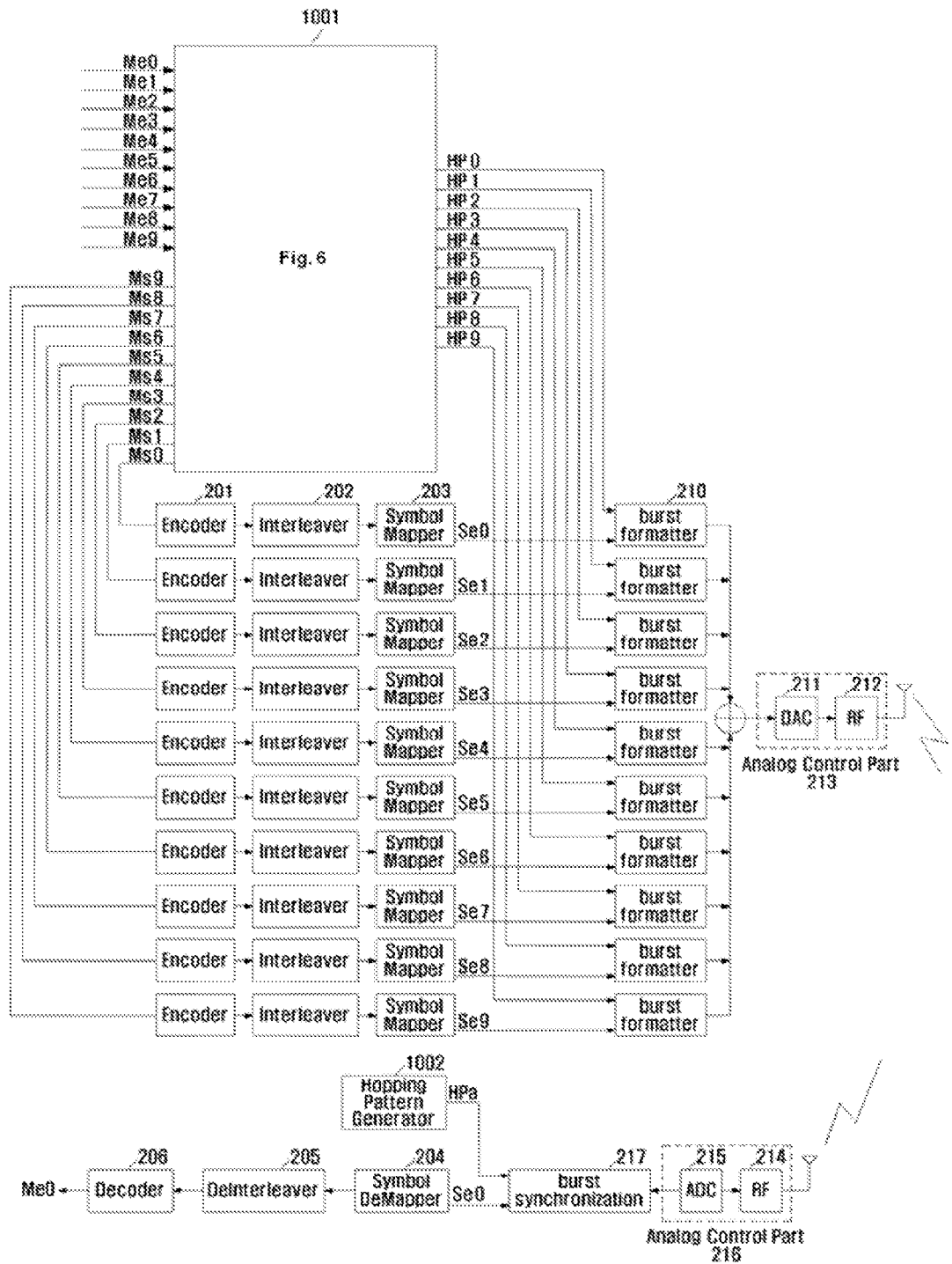
FIG. 10a is a block diagram of a transmitter implemented by adding FIG. 6 to the prior art and a receiver in an orthogonal resource (time) block hopping multiplexing communication system according to an embodiment of the present invention.

FIG. 10a is a diagram illustrating an orthogonal resource block hopping multiplexing system(ORBHM) that uses time slots as resources. The ORBHM system is constructed by adding the functions 1001 shown in FIG. 6 to the first communication station of a conventional OTDM system and by adding a hopping pattern generator 1002 to the second communication station thereof. Besides the addition of the hardware, signals HP0~HP9 generated by a hopping pattern generator are used in FIG. 10a, in place of signals T0~T7 representing time slots used by messages to be transmitted to respective second transmission stations in FIG. 2a. It is also modified that messages Me0~Me7 to be transmitted are also temporarily stored in a memory block and then Ms0~Ms9 are sent to the input of encoders according to the signal of the collision detector and controller.

Figure 10B:
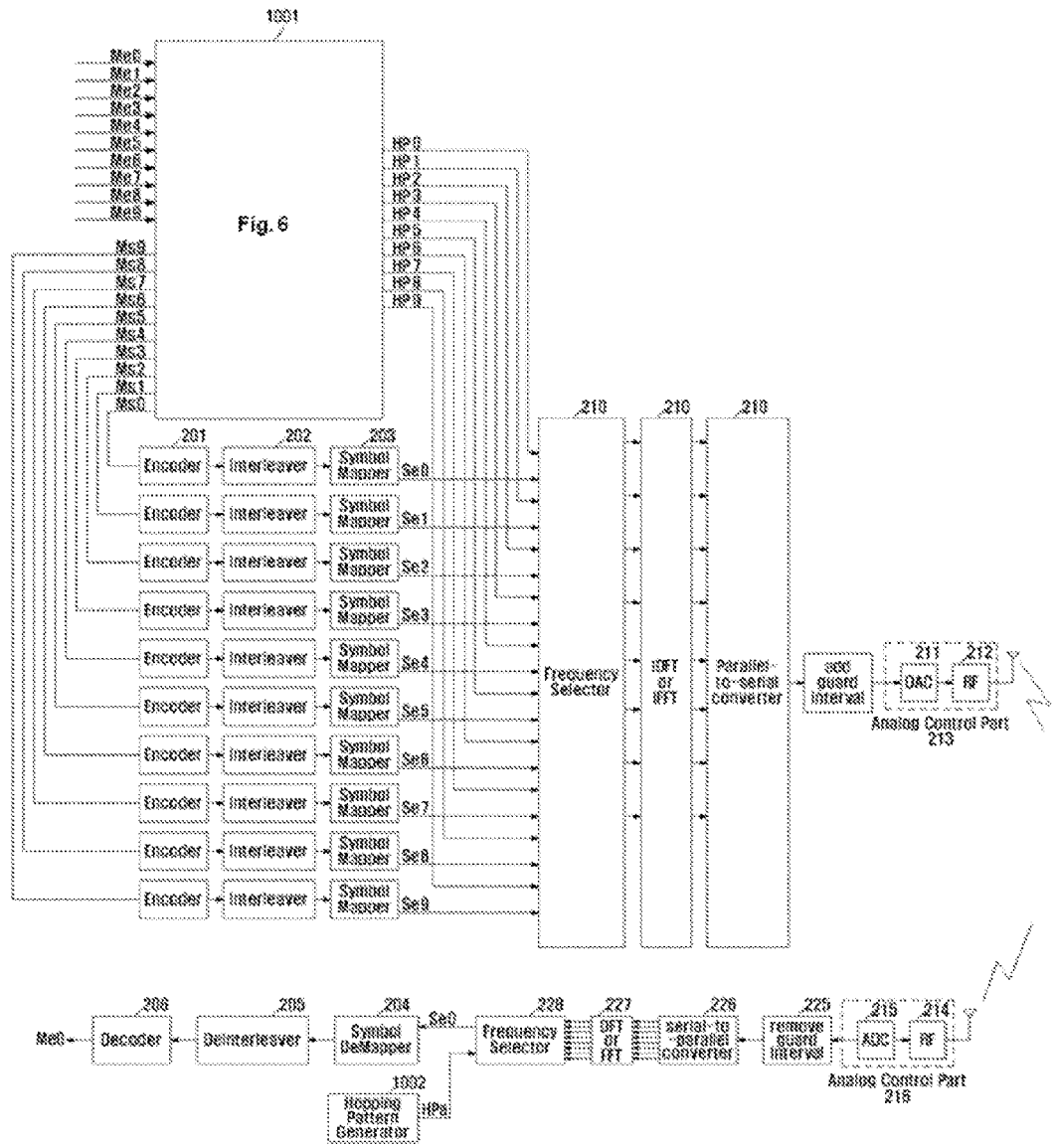
FIG. 10b is a block diagram of a transmitter implemented by adding FIG. 6 to the prior art and a receiver in an orthogonal resource (frequency) block hopping multiplexing communication system according to an embodiment of the present invention.

FIG. 10b is a block diagram illustrating an orthogonal resource block hopping multiplexing system which uses frequency bands as resources, which can be implemented from a conventional OFDM system by performing the same hardware addition and signal modifications (F0~F7->HP0~HP9) as the orthogonal resource block hopping multiplexing system which uses time slots as resources.

Figure 10C:
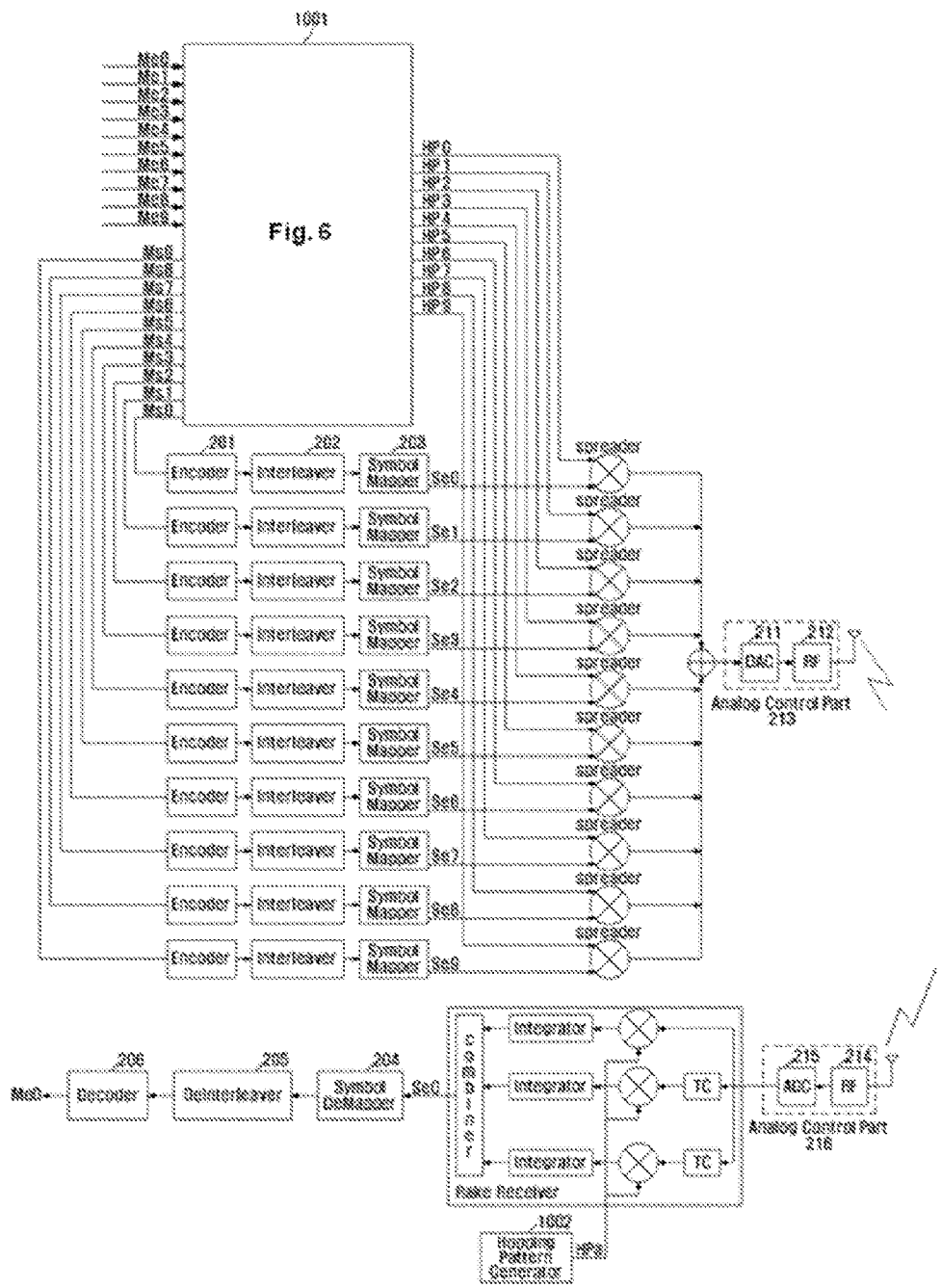
FIG. 10c is a block diagram of a transmitter implemented by adding FIG. 6 to the prior art and a receiver in an orthogonal resource (code) block hopping multiplexing communication system according to an embodiment of the present invention.

FIG. 10c is a block diagram illustrating an orthogonal resource block hopping multiplexing system which uses orthogonal codes as resources, which is implemented by modifying a conventional OCDM system through the same hardware addition and signal modifications as shown FIGS. 10a and 10b, besides the use of orthogonal codes in place of time slots or frequency bands.

Figure 10D:
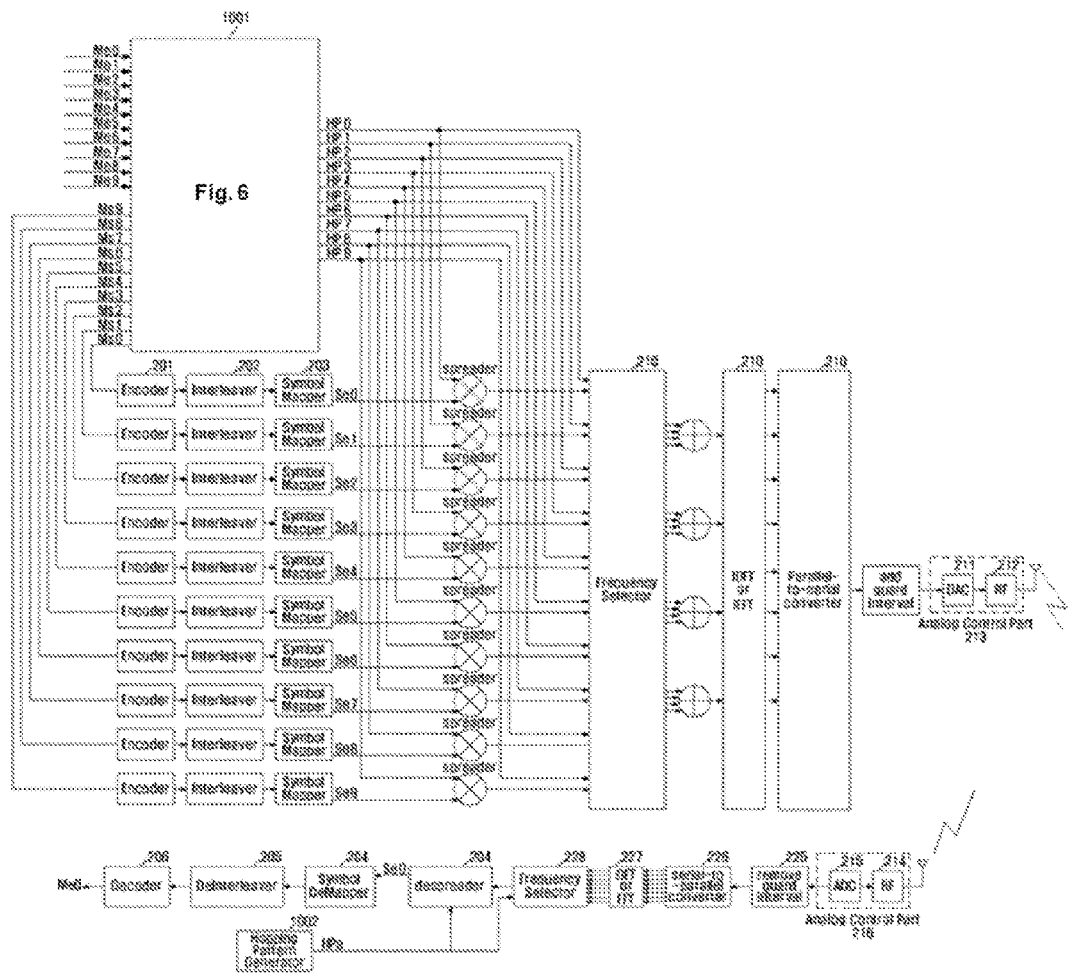
FIG. 10d is a block diagram of a transmitter and a receiver in an orthogonal resource (frequency, code) block hopping multiplexing communication system implemented according to an embodiment of the present invention.

FIG. 10d is a block diagram illustrating an orthogonal resource block hopping multiplexing system which uses frequency bands and orthogonal codes as resources. The hopping pattern shown in FIG. 6 determines frequency bands as well as orthogonal codes used by respective messages simultaneously and notifies them, in view of a transmitter. For example, in the case of the hopping pattern HP0 of channel 0, a front part (the bits 0~3 of HP0) may be used for allocating orthogonal codes and a rear part (the bits 4~7 of HP0) may be used for allocating frequency bands.

Although systems in which one or two types of orthogonal resources are used are shown in the above-described examples, the present invention is applicable, regardless of the number of orthogonal resources.

Figure 11A:
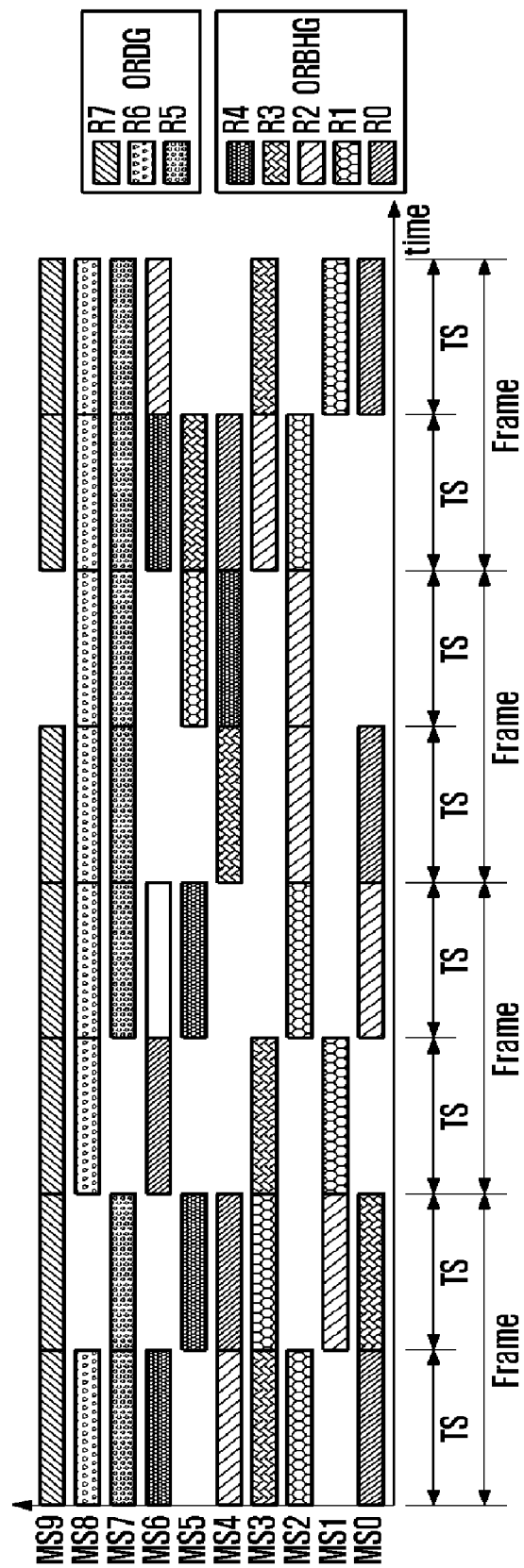
FIG. 11a is a diagram illustrating a concept in which channels are assigned to respective second communication stations using both an orthogonal resource division multiplexing method and an orthogonal resource block hopping multiplexing method in the case where traffic with high activity and traffic with low activity coexist according to an embodiment of the present invention.
Figure 11B:
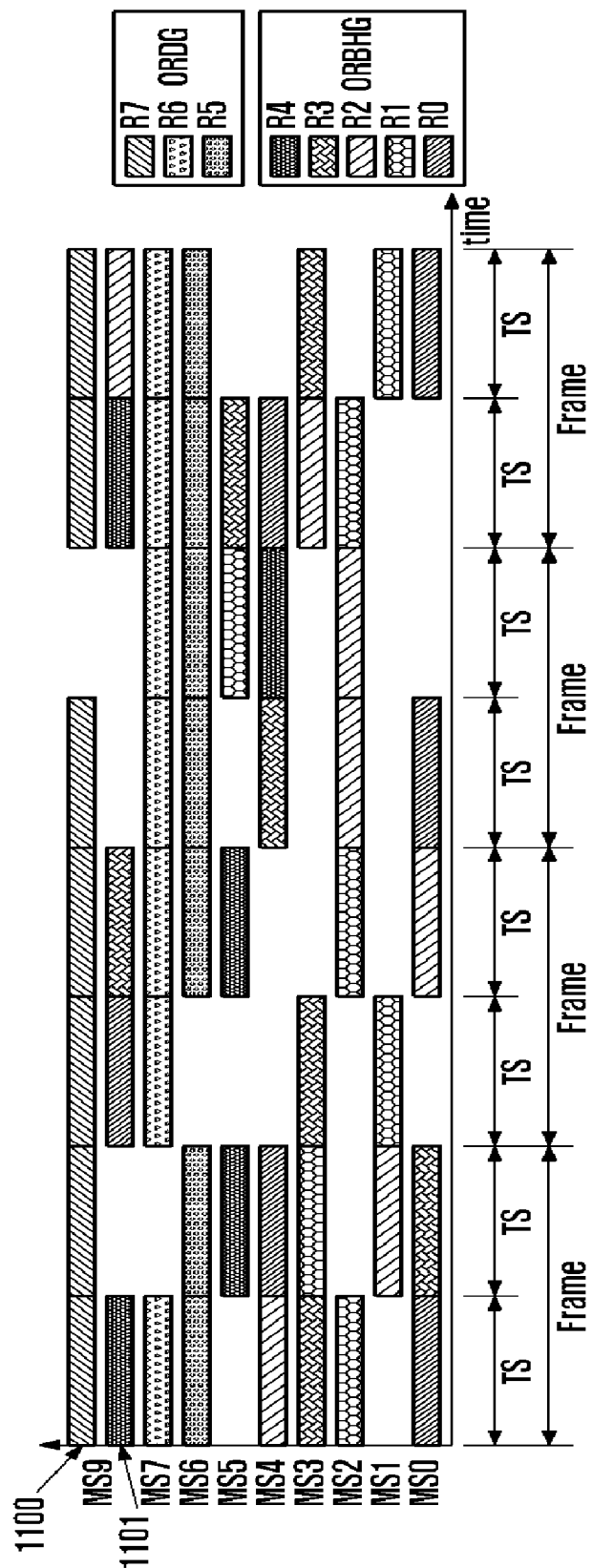
FIG. 11b is a diagram illustrating a concept in which one second communication station simultaneously uses channels according to the orthogonal resource division multiplexing method and channels according to the orthogonal resource block hopping multiplexing method.
Figure 11C:
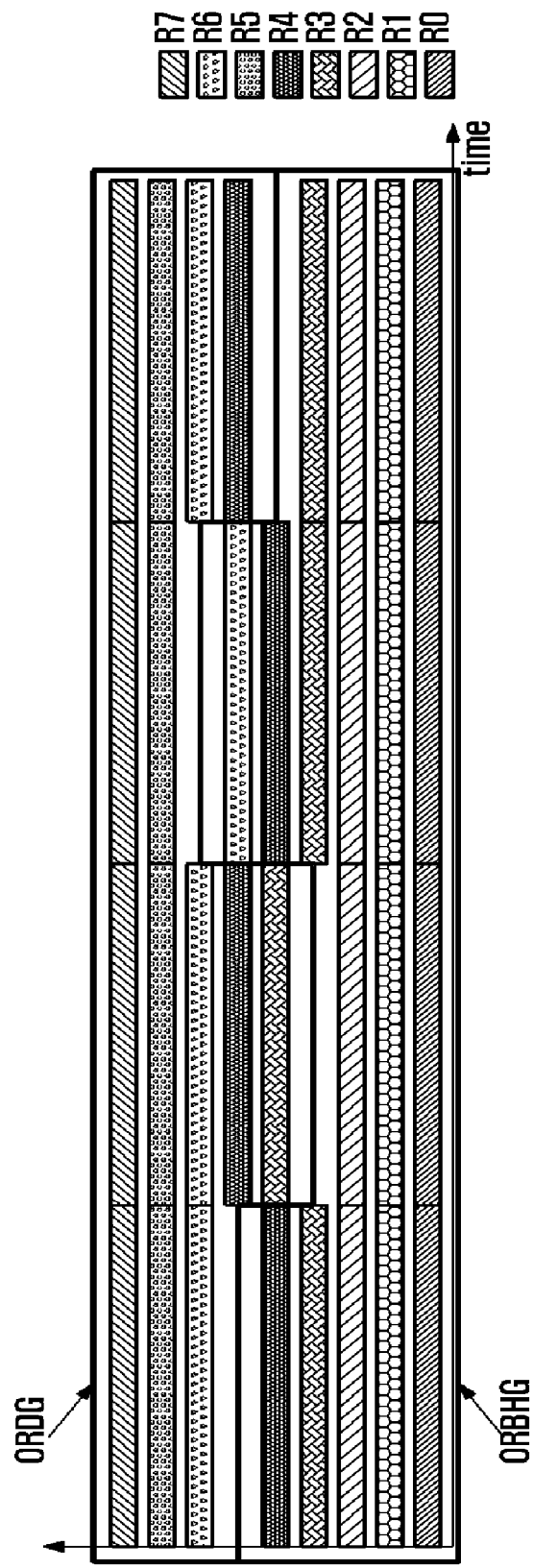
FIG. 11c is a diagram illustrating a concept in which orthogonal resource groups belonging to the orthogonal resource division multiplexing method and orthogonal resource groups belonging to the orthogonal resource block hopping multiplexing method are dynamically assigned.

Until now, orthogonal resource block hopping multiplexing methods are described. As described above, the orthogonal resource block hopping multiplexing methods can be viewed as methods which are more beneficial in the case that each second communication station receives traffic with low activity. However, all second communication stations always do not receive traffic with low activity. According to various situations, traffic with high activity may also exist. In the case of traffic with high activity, an orthogonal resource division multiplexing method may be more desired. Therefore, in the present invention, it is possible that the entire orthogonal resources are divided into an Orthogonal Resource Division Group (ORDG) used by the orthogonal resource division multiplexing method and an Orthogonal Resource block hopping Group (ORBHG) used by the orthogonal resource block hopping multiplexing method, so that the two methods coexist. That is, channels are assigned by respectively assigning ORDGs R5~R7 to respective second communication stations MS7~MS9 desiring to receive traffic with high activity as shown in FIG. 11a to always use one BORB, and channels are assigned to the second communication stations MS0~MS6 desiring to receive traffic with low activity, according to a hopping pattern between ORBHGs R0~R4. The operation may be performed in the hopping pattern generator 601 of FIG. 6. The hopping pattern generator for a second communication station, to which an ORDG is assigned, always outputs the BORB numbers to be assigned, and the second communication stations, to which channels according to hopping patterns are assigned, generate hopping patterns using the hopping pattern generator as shown in FIG. 7 and outputs the BORB numbers Hpa~HPj. Furthermore, in the case where a specific second communication station receives traffic with low activity and traffic with high activity simultaneously, it is possible that a channel 1100 using an ORDG and a channel 1110 using an ORBHG may be simultaneously assigned to the specific second communication station MS9. Furthermore, both resources belonging to the ORDG and resources belonging to the ORBHG can be dynamically assigned as shown in FIG. 11c. That is, both the amount of resources belonging to the ORDG and the amount of resources belonging to the ORBHG may be altered depending on the respective amount of traffic which is accommodated in a current system.

Although the detailed description for the embodiments of the present invention is for mobile communication systems, the multiplexing methods suggested by the present invention are applicable to wired communication systems as well as wireless communication systems.

Furthermore, although one example where 8 second communication stations exist is described in the embodiments of the present invention, any arbitrary number of second communication stations may be possible.

INDUSTRIAL APPLICABILITY

As described above, the present invention relates to a multi-user communication system, including at least one first communication station and a plurality of second communication stations, in which a plurality of second communication stations communicate through a single medium where a finite number of communication channels may coexist. More particularly, the present invention relates to a multiplexing method and apparatus that enable a larger number of second communication stations than the finite number of determined communication channels, to simultaneously communicate, compared with conventional methods in which a finite number of second communication stations can simultaneously communicate using a finite number of dedicated communication channels. That is, the present invention relates to a multiplexing method and apparatus. This system includes a first communication station and a plurality of synchronized second communication stations. The first communication station distinguishes channels to second communication stations using assigned orthogonal resource block hopping patterns, and determines the orthogonal resource block hopping patterns corresponding to respective second communication stations using any method of reducing collisions in allocation orthogonal resource blocks among hopping patterns, and if the orthogonal resource blocks are identically allocated to multiple second communication stations, one collision-related channel is selected and the message to the designated channel is transmitted and the other in messages to the remaining channels are delayed for transmission in subsequent time slots. The multiplexing method and apparatus can be utilized in packet based mobile communication systems.

The invention claimed is:

1. In a communication system including one first communication station and one or more second communication stations, an orthogonal resource block hopping multiplexing method comprising the steps of:
   defining a Basic Orthogonal Resource Block (BORB);
   dividing all orthogonal resources into BORBs;
   distinguishing communication channels according to assigned hopping patterns in which hopping is performed within all the orthogonal resources on a BORB basis;
   allocating communication channels to the second communication stations; and
   multiplexing the channels to the second communication stations,
   wherein, if there is a communication channel collision for a specific BORB, multiplexing means to select a second communication station among the collided second communication stations, and if there is no communication channel collision for a specific BORB, multiplexing means to select the second communication station which is allocated to use the specific BORB.

2. The method as set forth in claim 1, wherein a transmission rate of messages is adjusted by assigning one or more communication channels to each of the second communication stations every time slot (interval) depending on the amount of messages to be received by the second communication station.

3. The method as set forth in claim 1 or 2, wherein time slots (intervals) are considered as one of orthogonal resources.

4. The method as set forth in claim 3, wherein the BORB is a time slot with a uniform size.

5. The method as set forth in claim 1 or 2, wherein frequency bands are considered as one of orthogonal resources.

6. The method as set forth in claim 5, wherein the BORB consists of a frequency band with a predetermined size during a predetermined time slot.

7. The method as set forth in claim 1 or 2, wherein orthogonal codes are considered as one of orthogonal resources.

8. The method as set forth in claim 7, wherein the BORB consists of one or more orthogonal codes during a predetermined time slot.

9. The method as set forth in claim 1 or 2, wherein the orthogonal resources are used to maintain orthogonality and can be used to establish channels.

10. The method as set forth in claim 9, wherein the BORB consists of a resource with a predetermined size capable of transmitting a plurality of symbols during a predetermined time slot.

11. The method as set forth in claim 1 or 2, wherein the orthogonal resources comprise a combination of various orthogonal resources.

12. The method as set forth in claim 11, wherein the BORB consists of a combination of various orthogonal resources having a predetermined size during a predetermined time slot.

13. The method as set forth in claim 1, wherein the BORBs with different sizes are assigned to the respective second communication stations according to various situations.

14. The method as set forth in claim 3, wherein the BORBs with different sizes are assigned to the respective second communication stations according to various situations.

15. The method as set forth in claim 5, wherein the BORBs with different sizes are assigned to the respective second communication stations according to various situations.

16. The method as set forth in claim 7, wherein the BORBs with different sizes are assigned to the respective second communication stations according to various situations.

17. The method as set forth in claim 9, wherein the BORBs with different sizes are assigned to the respective second communication stations according to various situations.

18. The method as set forth in claim 11, wherein the BORBs with different sizes are assigned to the respective second communication stations according to various situations.

19. In a communication system including one first communication station and one or more second communication stations, an orthogonal resource block hopping communication transmission apparatus comprising:
   an orthogonal resource block hopping pattern generator;
   a collision detector and controller for detecting collisions among hopping patterns and selecting one to be transmitted among colliding channels;
   a memory block for temporarily storing data to be delayed;
   a communication signaling system for notifying the colliding channels to be selected for transmission when a collision among the hopping patterns occurs; and
   a communication signaling system that uses a control channel different from data channels for transmitting data in order to notify the respective second communication stations of existence and absence of a message at every time slot.

20. The apparatus as set forth in claim 19, further comprising a communication signaling system to insert predetermined signals for distinguishing the second communication stations, which will receive messages, into the messages to be transmitted.

21. In a communication system including one first communication station and one or more second communication stations, an orthogonal resource block hopping communication receiver apparatus comprising an orthogonal resource block hopping pattern generator;
   a device capable of handling a communication signal system for notifying one of the colliding channels to be selected for transmission when a collision among the hopping patterns occurs; and
   a device for detecting the destination of messages using a communication signaling system that uses a control channel different from data channels for transmitting data in order to notify the respective second communication stations of existence and absence of a message at every time slot (interval).

22. The apparatus as set forth in claim 21, further comprising a device for detecting the destination of messages using predetermined signals included in a message to be transmitted.

* * * * *